(12) United States Patent
Donoho et al.

(10) Patent No.: US 6,766,062 B1
(45) Date of Patent: Jul. 20, 2004

(54) DIGITAL RIDGELET TRANSFORM VIA DIGITAL POLAR COORDINATE TRANSFORM

(75) Inventors: David L. Donoho, Berkeley, CA (US); Emmanuel J. Candes, Palo Alto, CA (US)

(73) Assignee: The Board of Trustees of the Leland Stanford Junior University - Office of Technology, Palo Alto, CA (US)

( * ) Notice: Subject to any disclaimer, the term of this patent is extended or adjusted under 35 U.S.C. 154(b) by 0 days.

(21) Appl. No.: 09/504,924

(22) Filed: Feb. 16, 2000

(51) Int. Cl.[7] ............................ G06K 9/36; H04N 11/20
(52) U.S. Cl. ..................... 382/240; 382/280; 348/442
(58) Field of Search ............................. 382/276, 280, 382/300, 240, 260, 254, 128, 130, 132, 263, 275, 293; 378/4, 21; 358/525; 345/639; 348/442

(56) References Cited

U.S. PATENT DOCUMENTS

| | | | | |
|---|---|---|---|---|
| 5,539,316 A | * | 7/1996 | Sukumar | 324/320 |
| 5,953,388 A | * | 9/1999 | Walnut et al. | 378/4 |
| 5,982,917 A | * | 11/1999 | Clarke et al. | 382/132 |
| 6,151,378 A | * | 11/2000 | Rasche et al. | 378/4 |
| 6,151,415 A | * | 11/2000 | Acharya et al. | 382/255 |
| 6,266,452 B1 | * | 7/2001 | McGuire | 382/294 |
| 6,415,046 B1 | * | 7/2002 | Kerut, Sr. | 382/128 |

OTHER PUBLICATIONS

Oleg Andric et al. (Wavelets in Polar Coordinates, pp. 1507–1510, IEEE–1996).*

* cited by examiner

Primary Examiner—Kanji Patel
(74) Attorney, Agent, or Firm—Antonelli, Terry, Stout & Kraus, LLP

(57) ABSTRACT

A data processing technique called a Ridgelet transform is disclosed for more efficiently representing information. Original data samples (e.g., in the time domain) are received and transformed into frequency domain values provided in Cartesian coordinates. The frequency domain values provided in Cartesian coordinates are then transformed to digital polar coordinates (provided in a digital polar grid). Because the polar grid is non-uniform, the polar coordinate values can be weighted or normalized. A Wavelet transform is performed on data derived the frequency domain values provided in digital polar coordinates to generate Wavelet coefficients (or Ridgelet coefficients). Next a thresholding or filtering process can be performed on the Ridgelet coefficients to select a group of larger Wavelet coefficients and to discard the remaining Wavelet coefficients.

21 Claims, 17 Drawing Sheets o – LOCATIONS OR LATTICE POINTS OF KNOWN
    DATA IN RECTANGULAR GRID x – LOCATIONS OF SAMPLING POINTS ALONG
    RADIAL LINES OF POLAR GRID TO WHICH
    RECTANGULAR GRID SHOULD BE INTERPOLATED n x n ARRAY OF POLAR COORDINATE DATA SAMPLES $\tilde{f}s$ $$\tilde{f}s(l, m) : -\frac{n}{2} \leq l, m < \frac{n}{2}$$

(WAVELETS ESTIMATE)

(RIDGELETS ESTIMATE)

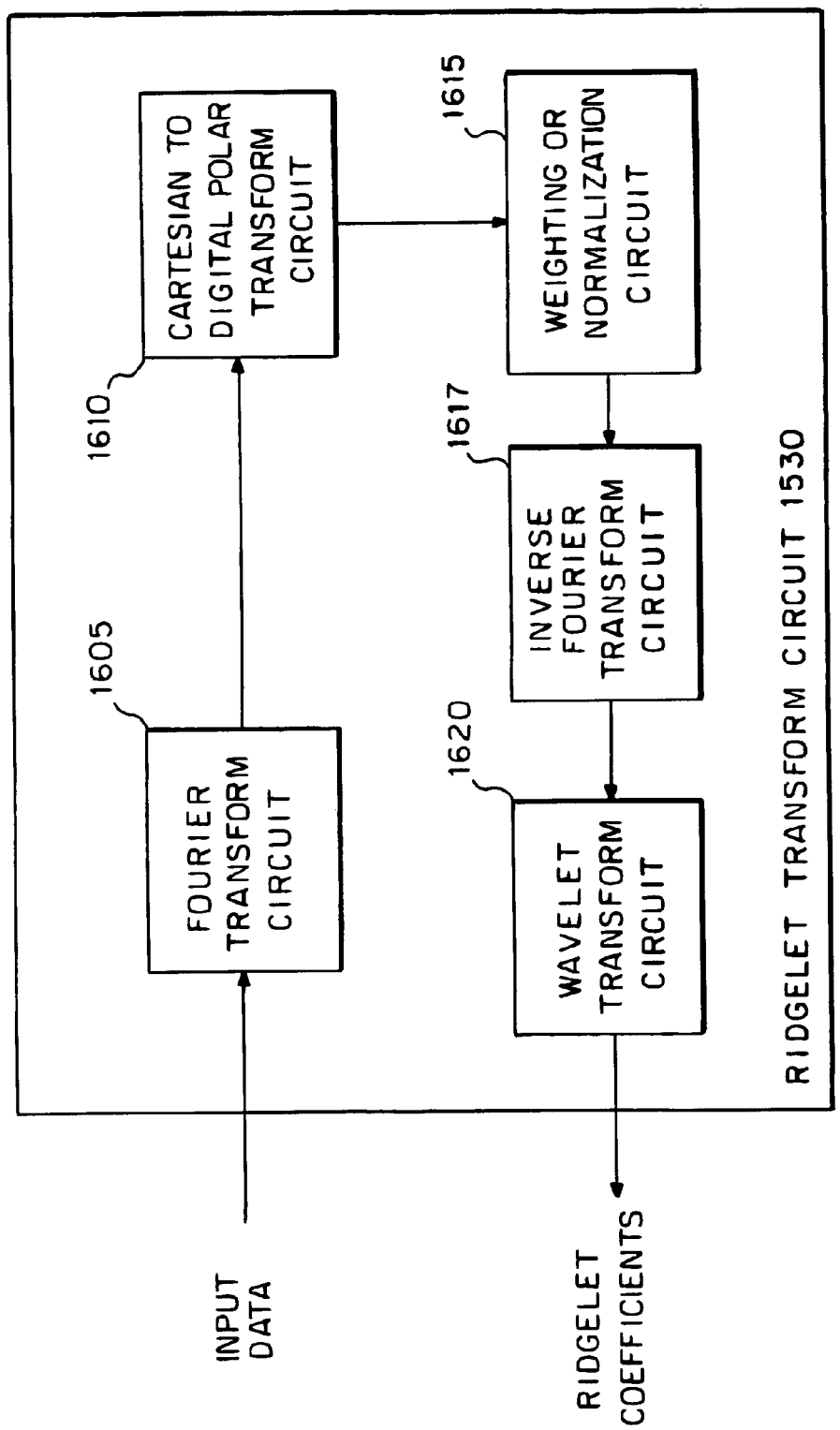

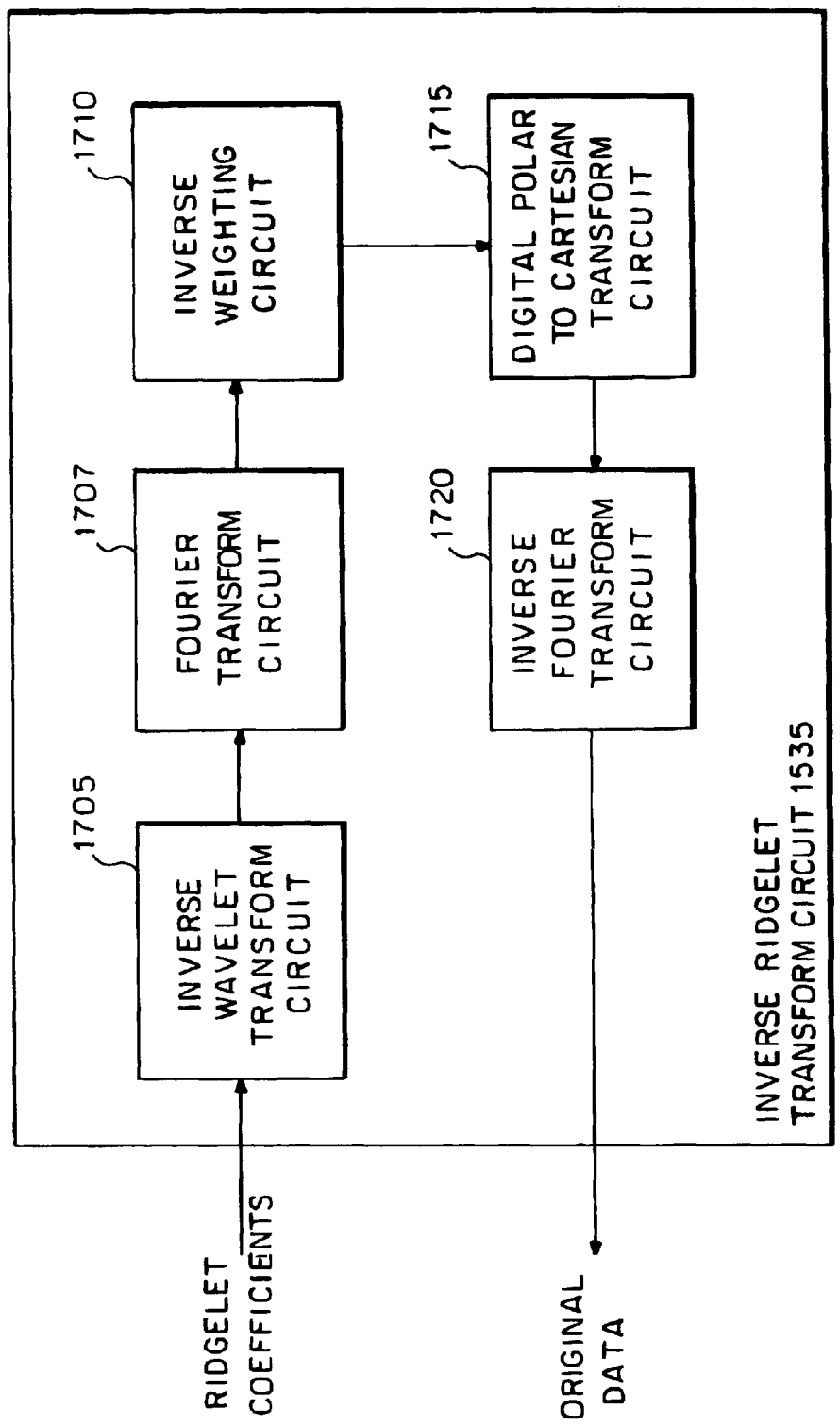

DIGITAL RIDGELET TRANSFORM VIA DIGITAL POLAR COORDINATE TRANSFORM

FIELD

The invention generally relates to data processing and compression and more particularly to a new technique for representing data more efficiently, referred herein as a digital Ridgelet transform.

BACKGROUND

As the amount of information that is available or needed increases, the need for more efficient ways to represent the information increase as well. The goal of data compression is to more efficiently represent information. The information can be in a variety of forms, such as speech, images, text, video, music, etc.

In particular, there has been a very rapid increase in the amount of information stored as images, especially remotely sensed images from weather and other satellites, and medical images such as CAT scans, magnetic resonance images, and mammograms. A pixel representation of an image is a very inefficient representation due to the redundancies in the image. These images must typically be remotely accessible by Doctors and other individuals, and thus, must be transmitted over networks or other links. If the image can be more efficiently represented, the image can be stored using less memory and can be more quickly transmitted over a data or computer network or over a transmission link, etc. in less time or transmitted using less bandwidth.

A number of different transforms, such as Discrete Cosine Transform and Wavelet Transform, etc., have been used in attempt to compress data. While providing data compression, many of these transform techniques can introduce losses or errors which can significantly distort the image. Many current transform or compression techniques calculate a transform coefficient across a block of pixels or sample values. As a result, the lines in the reconstructed image are typically imprecise and are jagged or rough. Such a jagged or imprecise line in the reconstructed image can be a problem where doctors or scientists must precisely identify the boundary or line between two objects in an image.

Therefore, a need exists for a technique to efficiently represent or compress data while allowing a more accurate reconstructed image, particularly along lines in the image.

SUMMARY

According to an embodiment of the present invention, a technique which is called a Ridgelet transform is disclosed for more efficiently representing information. According to an embodiment of the present invention, original data samples (e.g., in the time domain) are received. The original data samples are then transformed into frequency domain values provided in Cartesian coordinates using a Fourier transform or other technique. The frequency domain values provided in Cartesian coordinates are then transformed to digital polar coordinates (provided in a digital polar grid). Because the polar grid is non-uniform, the polar coordinate values are weighted or normalized. A Wavelet transform is performed on values derived from the frequency domain values provided in digital polar coordinates to generate Wavelet coefficients (or Ridgelet coefficients). Next a thresholding process can be performed. According to the thresholding process, the Wavelet coefficients are filtered to select a group of larger Wavelet coefficients and discard the remaining Wavelet coefficients (e.g., select those coefficients which are greater than a threshold, and discard the remaining coefficients). Many of the Ridgelet coefficients have a value that is negligible compared to some of the larger Ridgelet coefficients. The result is a representation of the original information that is much more efficient or compressed, while allowing an accurate reconstruction of the original information therefrom. The Ridgelet transform of the present invention can advantageously be used in a wide variety of applications including compression (such as image or data compression), statistical estimation (including noise removal, edge detection and feature detection), scientific or mathematical computing, and the like.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 16 is a block diagram of a Ridgelet transform circuit according to an example embodiment of the present invention.

FIG. 17 is a block diagram of an inverse Ridgelet transform circuit according to an example embodiment of the present invention.

DETAILED DESCRIPTION

Figure 1:
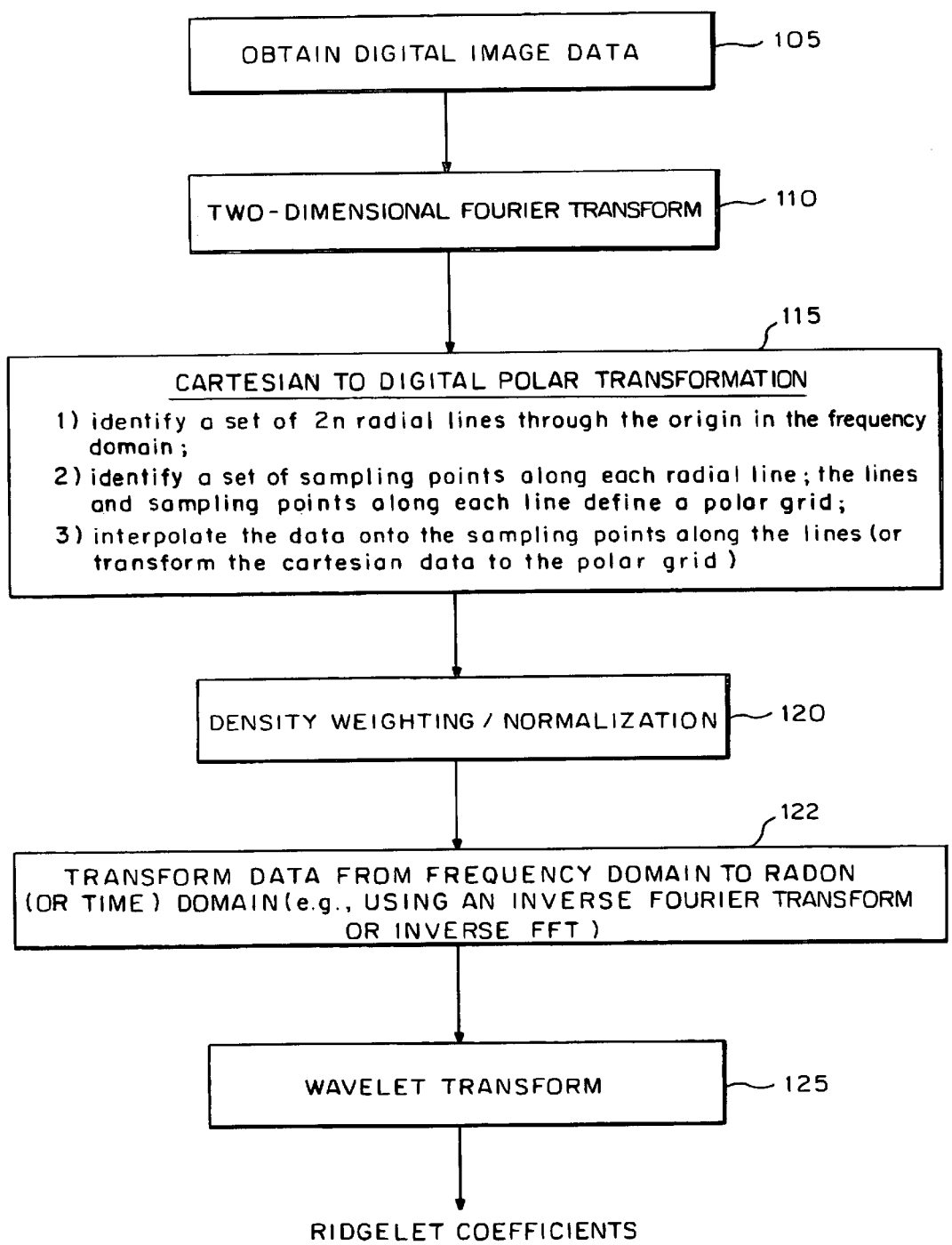
FIG. 1 is a flow chart illustrating an operation of a Ridgelet transform according to an example embodiment of the present invention.

Referring to the Figures in detail in which like numerals indicate like elements, FIG. 1 is a flow chart illustrating an operation of the Ridgelet transform according to an example embodiment of the present invention. An overview of the Digital Ridgelet Transform (or DRT) will be described, followed by a more detailed description of each step involved in the Ridgelet transform. The inverse Ridgelet transform and several applications and advantages of the Ridgelet transform are also described.

I. Overview of the Digital Ridgelet Transform (DRT)

FIG. 1 is a flow chart illustrating an operation of the Ridgelet transform according to an example embodiment of the invention. At block 105, digital data samples are obtained. The data samples may be pixel values from a two-dimensional image, for example, or other data samples. Thus, the resulting time-domain data may be provided as an n×n array of gridded samples f:

$$f(i_1, i_2): -\frac{n}{2} \le i_1, i_2 < \frac{n}{2},$$

where $i_1$, and $i_2$ are indices (or coordinates) into the n×n array of gridded data samples f.

At block 110, the time-domain data samples $f(i_1, i_2)$ are converted into a frequency domain representation using a Fourier Transform, such as a Discrete Fourier Transform (DFT) or a Fast Fourier Transform (FFT). This transform into the frequency domain can be performed as a two-dimensional Fourier Transform as follows (for example):

$$\hat{f}(k_1, k_2) = \sum f(i_1, i_2)\exp\left\{-i(k_1 i_1 + k_2 i_2)\frac{2\pi}{n}\right\}, -\frac{n}{2} \le k_1, k_2 < \frac{n}{2} \quad (1)$$

where $\hat{f}(k_1,k_2)$ are the Fourier coefficients and where the sum is over $$-\frac{n}{2} \le i_1, i_2 < \frac{n}{2}.$$

The result of block 110 is a two-dimensional array of Fourier coefficients $\hat{f}(k_1,k_2)$. The Fourier coefficients $\hat{f}(k_1,k_2)$ may be considered as samples on a square lattice or rectangular grid. Thus, $\hat{f}(k_1,k_2)$ may be considered to be rectangular or Cartesian grid data samples (in the frequency domain).

Block 115 of FIG. 1 will now be briefly described. According to an embodiment of the invention, the Ridgelet transform requires processing of sampled data lying on lines which pass through the origin. However, the only data (i.e., Fourier coefficients) we have from block 110 are the rectangular grid data samples $\hat{f}(k_1,k_2)$ which lie on a square lattice or rectangular grid. As a result, at block 115, the rectangular grid (or square lattice) data (the Fourier coefficients) are converted or transformed from Cartesian coordinates to polar coordinates.

Block 115, which involves a Cartesian to digital polar transformation (or conversion), may include three steps (as shown in FIG. 1), including: 1) identifying a set of 2n radial lines each passing through the origin in the frequency domain (of the rectangular gridded or Cartesian data samples). 2) identify a set of sampling points along each of these 2n radial lines. The 2n lines and the sampling points along these 2n lines define a digital polar grid. and, 3) the rectangular gridded or Cartesian data samples (i.e., Fourier coefficients provided on the square lattice or rectangular grid) are interpolated onto the sampling points on the 2n radial lines of the digital polar grid. This, in effect, transforms the data samples from Cartesian (or square lattice) coordinates to digital polar coordinates. It is digital because the samples are interpolated onto discrete sampling points on the 2n radial lines passing through the origin of the polar grid.

At block 120, the polar coordinate values output from block 115 are normalized using density weights. The digital polar grid (described above), including the 2n radial lines passing through the origin and the discrete sampling points along each radial line, is a non-uniform grid. As a result, the polar coordinate values output from block 115 can be normalized through a density weighting process.

At block 122, the data provided in the frequency domain is transformed to the Radon or time domain (e.g., using an inverse Fourier transform or an inverse FFT). Block 122 may be optional depending on how the wavelet trans form block 125 (described below) is implemented.

At block 125 of FIG. 1, a wavelet transform is applied to the values output from block 120 (which are Fourier coefficients which have been converted to polar coordinates, normalized, and then converted to the Radon or time domain). The wavelet transform is applied to each of the rows and then to each of the columns of the data. Block 125 then outputs the Ridgelet coefficients which provides a much more efficient representation than the original data samples (e.g., pixel values).

II. Details of the Ridgelet Transform

The Digital Ridgelet transform (DRT) is described generally above in connection with FIG. 1. Each of steps 115, 120, 122 and 125 of the DRT transform (FIG. 1) will now be described in greater detail, according example embodiments of the present invention.

A. Cartesian to Digital Polar Transform

1. Identify A Set of 2n Radial Lines Through the Origin

Figure 2:
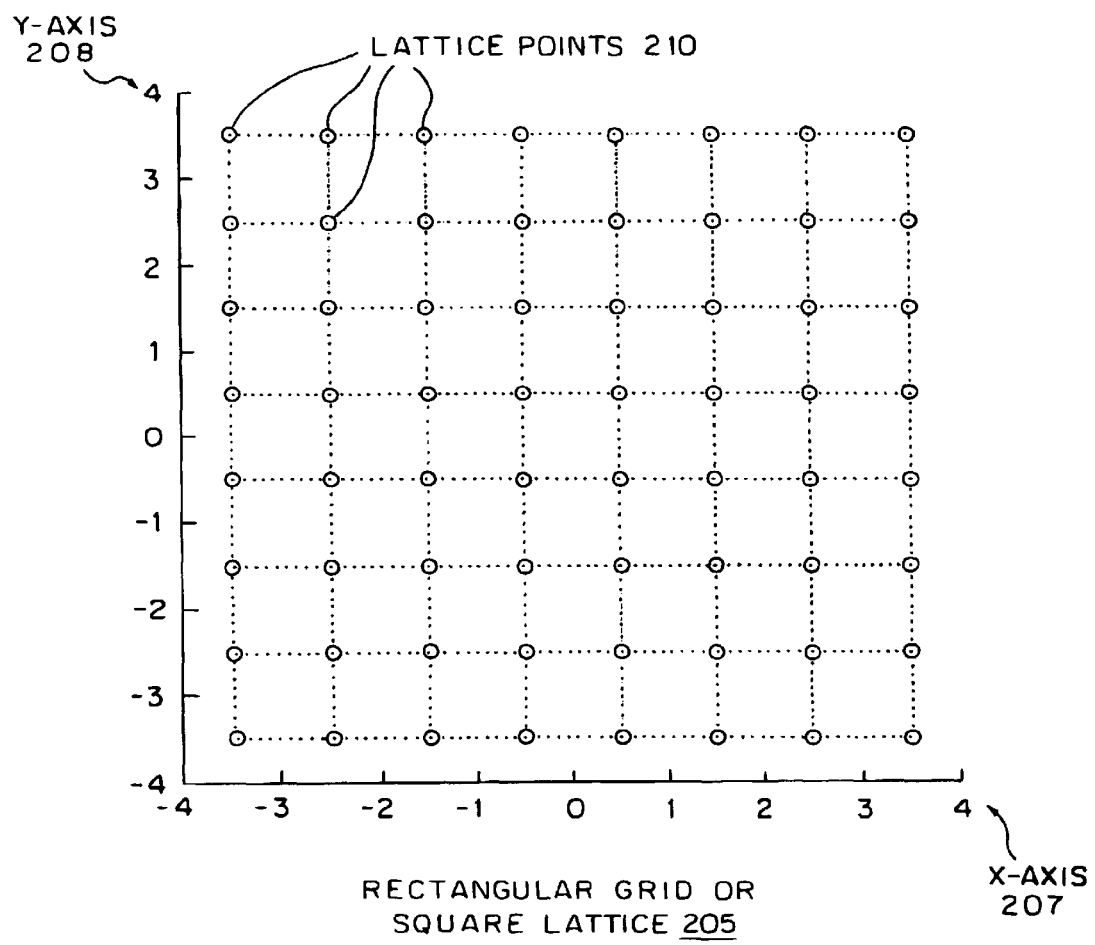
FIG. 2 is a diagram illustrating $n^2$ lattice points on a square lattice or rectangular (or Cartesian) grid according to an example embodiment of the present invention.

The result of block 110 is a two-dimensional rectangular array of Fourier coefficients $\hat{f}(k_1,k_2)$. The Fourier coefficients $\hat{f}(k_1,k_2)$ may be considered as samples on a square lattice or rectangular (Cartesian) grid. FIG. 2 is a diagram illustrating the $n^2$ lattice points on a square lattice or rectangular (or Cartesian) grid. Referring to FIG. 2, the square lattice or rectangular grid 205 includes an X-axis 207 and a Y-axis 209. The square lattice or rectangular (i.e., Cartesian) grid 205 includes $n^2$ lattice points 210, with each lattice point 210 corresponding to a Fourier coefficient $\hat{f}(k_1, k_2)$ (or other value in the frequency domain that is output by block 110).

However, the Ridgelet transform according to an embodiment of the present invention preferably processes sampled data lying on radial lines passing through the origin (e.g., data provided on a polar grid). Therefore, the data samples (or Fourier coefficients) provided on the square lattice or rectangular grid 205 should be converted or transformed to data samples lying on sampling points along the radial lines passing through the origin of polar grid (for example). Thus, the data samples f̂(k₁,k₂) (e.g., Fourier coefficients) provided in a rectangular grid (or square lattice) 205 or Cartesian coordinate system are converted to data samples provided on a polar grid (i.e., in polar coordinates). In other words, the data samples provided in a Cartesian (or rectangular) coordinate system are converted or transformed to data samples in a polar coordinate system. After completion of this step, the data will be ready for further processing.

Figure 3:
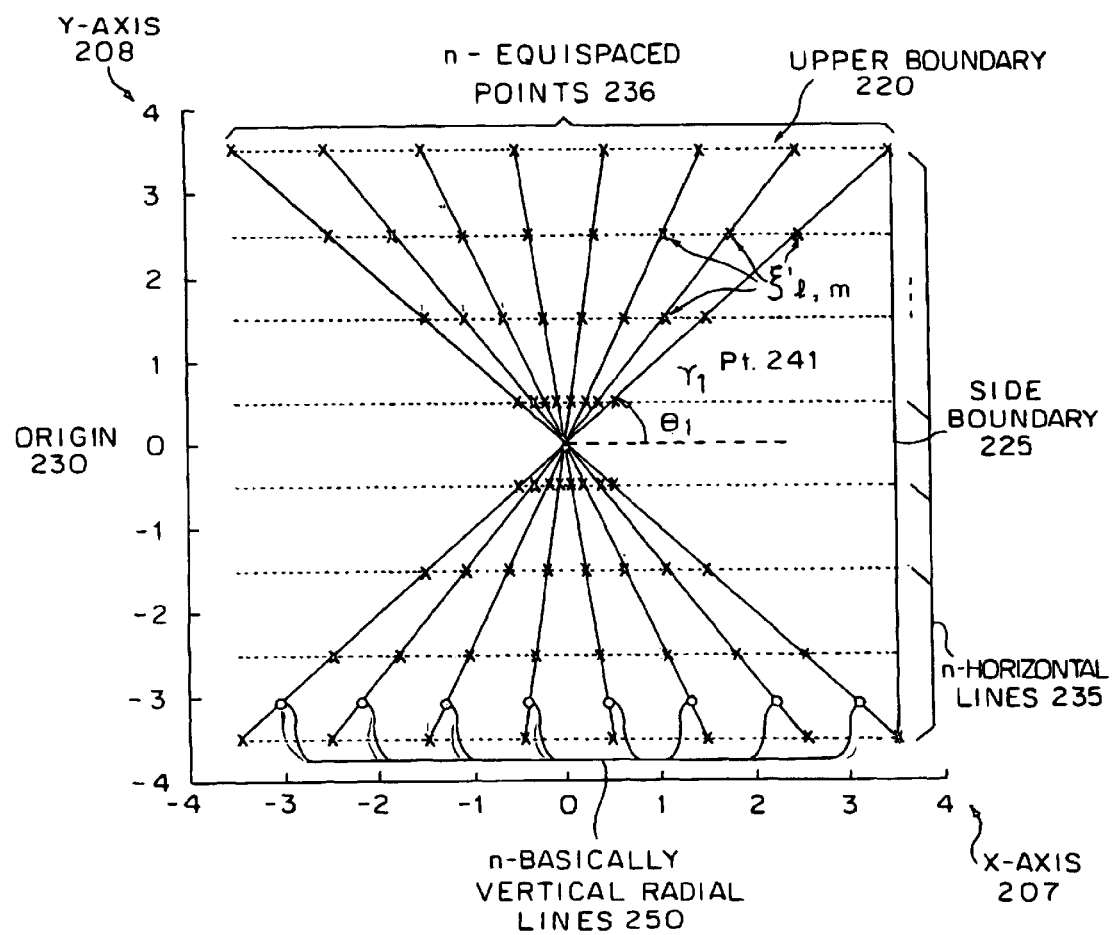
FIG. 3 is a diagram illustrating discrete sampling points along basically vertical radial lines of a polar grid according to an example embodiment of the present invention.
Figure 4:
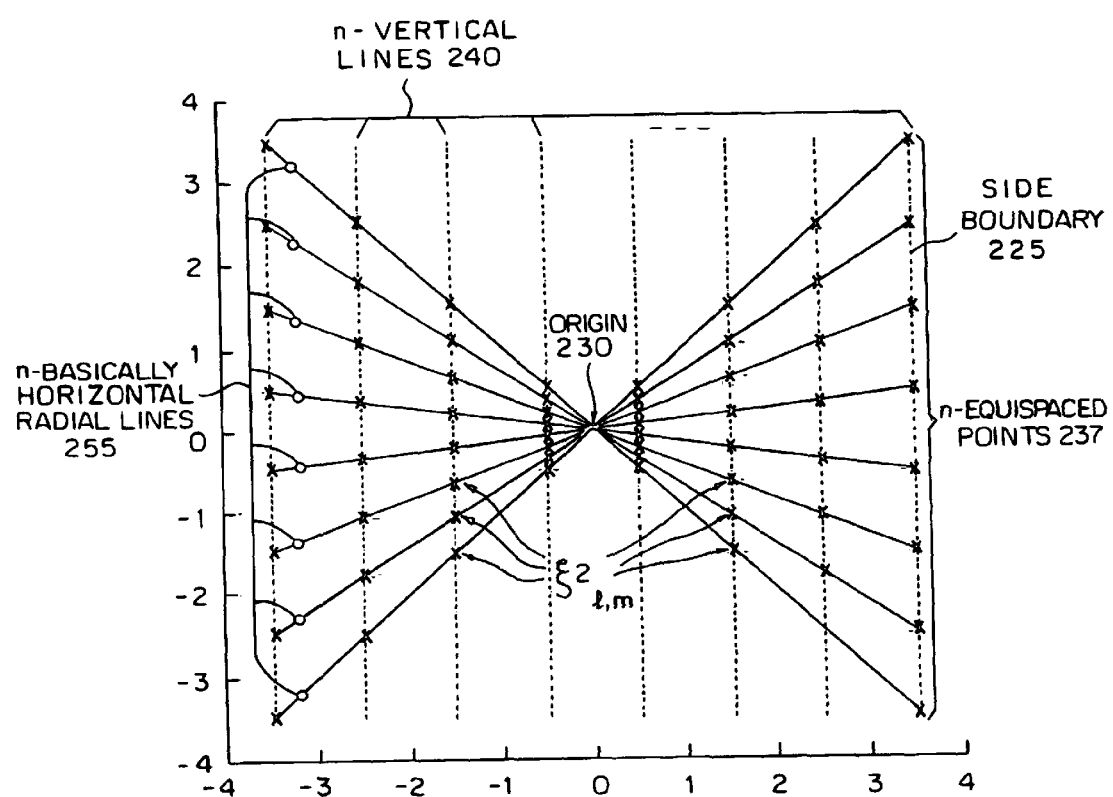
FIG. 4 is a diagram illustrating discrete sampling points along basically horizontal radial lines of a polar grid according to an example embodiment of the present invention.

FIG. 3 is a diagram illustrating discrete sampling points along basically vertical radial lines of a polar grid according to an example embodiment of the present invention. FIG. 4 is a diagram illustrating discrete sampling points along basically horizontal radial lines of a polar grid according to an example embodiment of the present invention. To simplify the Figures and the explanation of the invention, the radial lines passing through the origin are divided into: n basically vertical radial lines 250 (illustrated in FIG. 3) and n basically horizontal radial lines 255 (illustrated in FIG. 4).

A function of block 115 (according to an example embodiment) is to transform the n×n array of data samples f̂(k₁,k₂) (e.g., Fourier coefficients) provided in a rectangular grid into a pair of n×n arrays of data samples f̃$^s$ provided in polar coordinates (i.e., in a polar grid). The polar coordinate data samples may be described as:

$$\tilde{f}^s(l, m): \frac{-n}{2} \le l, m < \frac{n}{2},$$

where m identifies a radial line and l identifies either a horizontal or vertical line (the indices l and m together identifying the location or sampling point for the new data sample in the polar grid). The index s identifies the angular sector, where s=1 corresponds to angles in the range $$\frac{-\pi}{4} \text{ to } \frac{\pi}{4}$$

(corresponding to the n basically vertical radial lines 250, FIG. 3), and s=2 corresponds to angles in the range $$\frac{-\pi}{4} \text{ to } \frac{3\pi}{4}$$

(corresponding to the n basically horizontal radial lines 255, FIG. 4).

To identify the 2n radial lines (lines 250 and 255), first a set of n equispaced points 236 (FIG. 3) are identified on an upper boundary 220, and a set of n equispaced points 237 (FIG. 4) are identified on side boundary 225. Thus, each of the 2n radial lines (lines 250 or 255, FIGS. 3, 4) is defined by two points: one of the equispaced points along either the upper boundary 220 and side boundary 225 (i.e., equispaced points 236 or 237), and an origin 230 of the grid. It should be noted that the equispaced points 236 and 237 may be located along any shape of boundary (e.g., square, circle, oval). The boundaries 220 and 225 are shown to have a square shape, but other shapes and sizes can be used for defining the points 236 and 237. For example, a set of points may be located along a circle (or circular boundary), and then a set of radial lines generated, with a radial line extending from each of these circular boundary points through the origin (i.e., two points define a line). Other techniques can be used to identify or create a set of lines for a polar grid.

2. Identify A Set of Sampling Points Along Each Radial Line In the Polar Grid

Next, a plurality of discrete sampling points ($\xi^s_{l,m}$) in the polar grid are defined as follows:

$\xi^1_{l,m}$ is the sampling point at the intersection of the m$^{th}$ radial line (250, FIG. 3) and the l$^{th}$ horizontal line (235, FIG. 3), where s=1. In detail, $$\xi^1_{l,m} = \left(\frac{2\pi}{n}\text{lm}\frac{n}{2}, \frac{2\pi l}{n}\right), \frac{-n}{2} \le l, m < \frac{n}{2} \text{ (Shown in Fig. 3)}.$$

$\xi^2_{l,m}$ is the sampling point at the intersection of the m$^{th}$ radial line (255, FIG. 4) and the l$^{th}$ vertical line (240, FIG. 4), where s=2. In detail, $$\xi^2_{l,m} = \left(\frac{2\pi}{n}l, \frac{2\pi}{n}\text{lm}\frac{n}{2}\right), \frac{-n}{2} \le l, m < \frac{n}{2} \text{ (Shown in Fig. 4)}.$$

These discrete or digital sampling points are identified with an "x" in FIGS. 3 and 4. Referring to FIGS. 3 and 4, according to an example embodiment, the discrete sampling points on a radial line in the polar grid are not equispaced (or equally spaced) along each line. Rather, the discrete sampling points along each of the basically vertical radial lines 250 are equispaced (or equally spaced) as defined by the spacing of the n-horizontal lines 235 (FIG. 3). Similarly, the discrete sampling points along each of the basically horizontal radial lines 255 are equispaced (or equally spaced) as defined by the spacing of the n-vertical lines 240 (FIG. 4). Thus, the spacing of the discrete sampling points along each line may be considered uneven due to the angle of radial lines 250 and 255.

The next step (described in detail below) involves interpolating the rectangular grid data f̂(k₁, k₂) onto locations of the discrete sampling points $\xi^s_{l,m}$ in the polar grid. Polar coordinates may typically be considered to include a radial variable (r) identifying the distance from the origin and an angular variable (θ) identifying the angle measured from a reference line (such as a horizontal line). For example, the polar coordinate data value located at point 241 in FIG. 3 is located at a distance r₁ from the origin 230 and at an angle θ₁ measured from a horizontal line. Each radial line is located at a different angle θ. Therefore, all discrete sampling points $\xi^s_{l,m}$ along a radial line have the same angle (e.g., θ₁=π/4 for this example radial line on which point 241 is located).

The variables l and m (of the polar coordinate grid in FIGS. 3 and 4) together specify the polar coordinates for the data samples. Because the variable m specifies the radial line (and because each radial line is positioned at a unique angle θ), the variable m may be considered to be the angular variable (or at least corresponding to the angular variable θ) because m effectively specifies the angle for the data samples on a radial line. Similarly, because the variable l specifies the cross point or intersection, and thus, specifies the distance from the origin for each sampling point on a radial line, the variable l may be considered to be the radial variable (or at least corresponding to the radial variable r).

Figure 5:
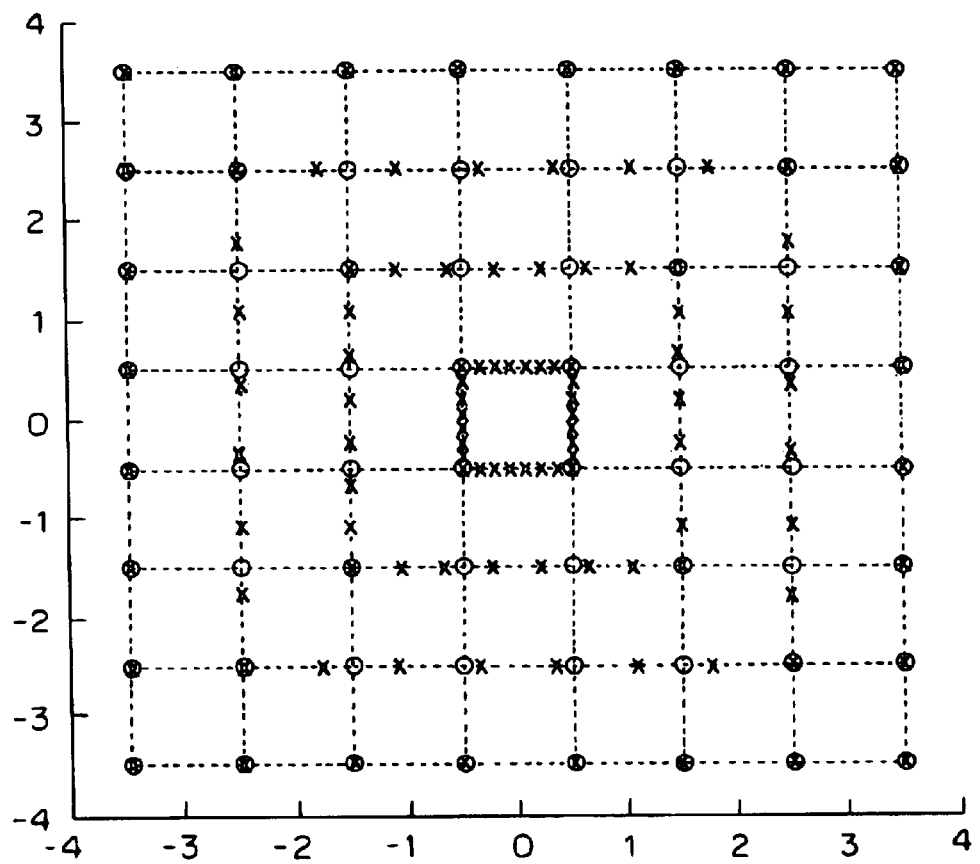
FIG. 5 is a diagram illustrating the locations of the known rectangular grid data $\hat{f}(k_1,k_2)$, and the locations of the discrete sampling points $\xi^s_{l,m}$ along the radial lines in the polar grid according to an example embodiment of the present invention.

3. Interpolate The Known Rectangular Grid Data Onto the Sampling Points on The Radial Lines in the Polar Grid FIG. 5 is a diagram illustrating the locations of the known rectangular grid data f̂(k₁,k₂), and the locations of the discrete sampling points $\xi^s_{l,m}$ along the radial lines (250, 255) in the polar grid according to an example embodiment of the present invention. The circles identify the locations or lattice points of the known rectangular grid data f̂(k₁,k₂), while Xs in FIG. 5 represent the sampling points $\xi^s_{l,m}$ in the polar grid. Thus, FIG. 5, in effect, combines FIGS. 2–4. A number of techniques can be used to perform this step of interpolating from the known rectangular grid data to the discrete sampling points of the polar grid.

According to an embodiment of the invention, this interpolation step can be performed by realizing that the known rectangular grid data $\hat{f}(k_1,k_2)$ (i.e., the known Fourier coefficients) may be considered as samples on a two-dimensional rectangular (or Cartesian) grid or square lattice of an underlying continuous bivariate trigonometric polynomial F. According to an embodiment of the invention, this interpolation step can be performed by using the known data $\hat{f}(k_1,k_2)$ of the rectangular grid to calculate the continuous trigonometric polynomial F (e.g., coefficients thereof). This generated trigonometric polynomial F can then be resampled at the sampling points $v^s_{l,m}$ along the radial lines in the polar grid to obtain the data samples in the polar grid. In this manner, the known data $\hat{f}(k_1,k_2)$ provided in the rectangular grid are effectively "interpolated" or otherwise transformed to the sampling points along the radial lines in the polar grid.

The continuous trigonometric polynomial F can be defined as follows:

$$F(w_1, w_2) = \sum_{i_1=-n/2}^{n/2-1} \sum_{i_2=-n/2}^{n/2-1} f(i_1, i_2) \exp\{-i(w_1 i_1 + w_2 i_2)\} \quad (2)$$

With this notation, the data in the rectangular grid (e.g., the Fourier coefficients) $\hat{f}(k_1,k_2)$ calculated in block 110 above, are the values of this trigonometric polynomial F on the square lattice $$\left(\frac{2\pi k_1}{n}, \frac{2\pi k_2}{n}\right) - n/2 \le k1, k2 < n/2.$$

Thus, the data in the rectangular grid (or Fourier coefficients), calculated in step 110 above, can be calculated from the continuous trigonometric polynomial F:

$$\hat{f}(k_1, k_2) = F\left(\frac{2\pi k_1}{n}, \frac{2\pi k_2}{n}\right). \quad (3)$$

Similarly, the corresponding data can be obtained on the digital polar grid by resampling the continuous trigonometric polynomial F at the sampling points $\xi^s_{l,m}$ of the polar grid. The continuous trigonometric polynomial F can be resampled at the discrete sampling points using a brute force technique by simply plugging in the discrete sampling point $\xi^s_{l,m}$ into the continuous trigonometric polynomial F as defined in equation (2):

$$\tilde{f}^s(l, m) = F(\xi^s_{l,m}), s = 1, 2, \frac{-n}{2} \le l, m < \frac{n}{2}. \quad (4)$$

However, to calculate the value at any point will require on the order of $n^2$ basic operations, and there are $2n^2$ points. Thus, this brute force technique may require on the order of $n^4$ operations. This is computationally very expensive and may even be impractical for some computers.

Therefore, an alternative technique can be used for performing the interpolation calculations. According to an embodiment of the invention, the interpolation can be performed more efficiently by recognizing that the points along a horizontal line (FIG. 3) or along a vertical line are equispaced. The $l^{th}$ row corresponds to $$w_2 = 2\pi l/n$$

in equation (2) and it follows from equation (2) that the restriction of polynomial F to a row is a trigonometric polynomial of degree n (having n coefficients, Cu). Therefore, according to an embodiment of the invention, the interpolation step can be efficiently performed as follows:

1) calculating the n coefficients Cu for each row (for each fixed value of 1, FIG. 3) and column (for each fixed value of 1, FIG. 4) for the trigonometric polynomial F; and 2) compute the polar coordinate values using a Fourier transform, and specifically a Fractional Fourier Transform, based on the coefficients Cu.

Let us fix $$w_2 = 2\pi l/n$$

and view equation (2) as a function of the first variable $w_1$ only; that is we let:

$$P(w_1) = \sum_{u=-n/2}^{n/2-1} C_u e^{iw_1 u}, \text{ with } P(w_1) = F(w_1, 2\pi l/n). \quad (5)$$

The coefficients Cu can be calculated from equation (2) as follows:

$$C_u = \sum_{i_2=-n/2}^{n/2-1} f(u, i_2) \exp\left\{-i\frac{2\pi}{n} l i_2\right\}.$$

Cu can be represented using another expression:

$$C_u = n^{-1} \sum_{k=-n/2}^{n/2-1} \hat{f}(k, l) \exp\left\{-i\frac{2\pi}{n} l i_2\right\}, \frac{-n}{2} \le u < \frac{n}{2}$$

This means that the coefficients Cu can be calculated using a Fast Fourier Transform (FFT) (calculated in n log n operations). Now that we have the coefficients Cu, equation (5) can be interpreted as the Fourier Transform of the vector Cu. The FFT cannot be used because the spacing between points at which it is computed is not equal to $2\pi/n$, rather it is of the form $\alpha 2\pi/n$, where $\alpha=2|l|/n$, when the $l^{th}$ row is being processed. However, a Fractional Fourier Transform can be calculated at these equispaced points, which is a much faster way to perform this calculation. As a result, the trigonometric polynomial F can be resampled at the discrete sampling points to obtain the polar coordinate data.

(Alternatively, an actual interpolation technique can be used to interpolate the known data samples in the rectangular (or Cartesian) grid to data samples in the digital polar grid or coordinate system, rather than regenerating and then resampling a trigonometric polynomial).

Now that the polar coordinate data samples $\tilde{f}^s(l,m)$ have been calculated, we now have the data samples along the radial lines ready to be further processed at step 120 (density weighting, FIG. 1), step 122 (inverse FFT, FIG. 1) and then step 125 (Wavelet transform, FIG. 1). However, to allow a computer to conveniently perform these additional processing steps, the polar coordinate data samples $\tilde{f}^s$ should preferably be stored or arranged in a n×2n array (or in 2 n×n arrays) $\tilde{f}^s(l,m)$:

$$\tilde{f}^s(l,m): \frac{-n}{2} \le l, m < \frac{n}{2}$$

Figure 6:
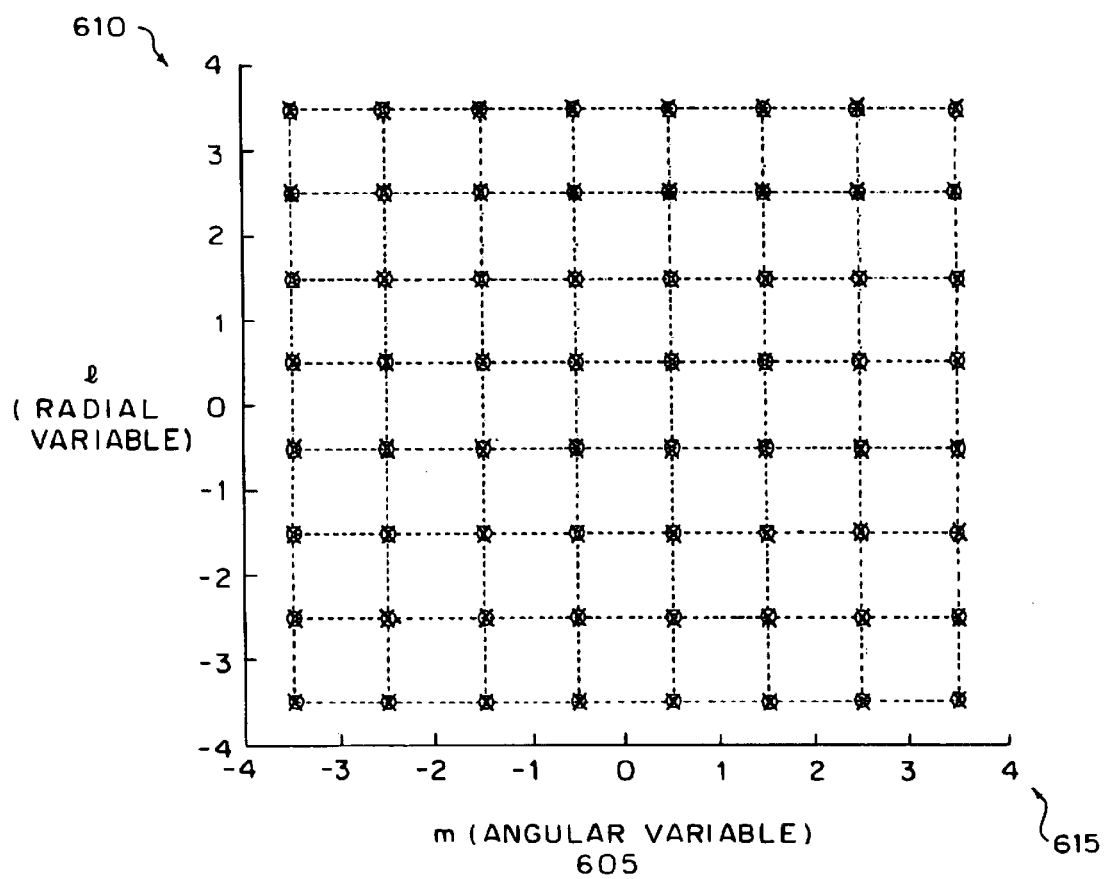
FIG. 6 is a diagram illustrating an n×n array of polar coordinate data samples $\hat{f}^s$ according to an example embodiment of the present invention.

FIG. 6 is a diagram illustrating an n×n array of the polar coordinate data samples $\tilde{f}^s$ according to an example embodiment of the present invention. The array 605 includes the polar coordinate data samples arranged, with the l variable shown as the vertical axis 610 and the m variable shown as the horizontal axis 615. This illustrates one way in which the polar coordinate data samples can be arranged in an array to allow a computer to more easily process the data samples. Other alternative arrangements of the data can be used.

B. Density Weighting (or Normalization)

According to an embodiment, the polar coordinate data samples $\tilde{f}^s$ output from block 115 are normalized using density weights. The digital polar grid, including the 2n radial lines passing through the origin and the discrete sampling points along each radial line, may be considered to be a non-uniform grid. As a result, the polar coordinate values output from block 115 can be normalized or weighted through a density weighting or normalization process. According to an example embodiment, the density weighting (or normalization) can be performed according to the following. The polar coordinate samples can be normalized using weights $w_{l,m}{}^s$ of the form:

$$w_{l,m}^s = \frac{2l}{n} \quad 0 < |l| \le \frac{n}{2}$$
$$\frac{l}{n} \quad l = 0$$

In general, the number of sampled points in a small region near the sampling point $\xi^s{}_{l,m}$ is proportional to $w_{l,m}{}^s$. According to an embodiment of the invention, the normalizing transformation is:

$$\bar{f}^s(l,m): \tilde{f}^s(l,m) \cdot \sqrt{w_{l,m}^s}$$

Other weighting operations or normalizations can be used (if a weighting is desired).

C. Transform from Frequency Domain to Radon or Time Domain

At block 122, the weighted polar coordinate samples $\bar{f}^s(l,m)$ (which are provided in the frequency domain) are converted to the Radon or time domain using an inverse Fourier transform or an inverse Fast Fourier Transform (FFT) to produce an array of sampled Radon data $R_f(\lambda, m)$, where $\lambda$ is the angular variable in the Radon (or time) domain. This can be done by performing an inverse Fourier transform on the weighted polar coordinate samples $\bar{f}^s(l,m)$ along the radial variable to produce Radon data $R_f(\lambda, m)$.

D. Wavelet Transform

At block 125, a wavelet transform is applied to the values output from block 122 (which are Fourier coefficients which have been converted to polar coordinates, normalized and then converted to Radon data), to output the Ridgelet coefficients. There are several ways in which a Wavelet transform can be performed on the data. An example embodiment of a Wavelet transform will now be briefly described.

According to an example embodiment, the Wavelet transform of block 125 (FIG. 1) includes two steps: 1) an orthonormal Wavelet transform along the radial variable (l or $\lambda$), with the angular variable (m) fixed (i.e., a Wavelet transform across each column of FIG. 6, after density weighting) to generate an intermediate array; and 2) a Wavelet transform along the angular variable (m) of the intermediate array, with the radial variable (l or $\lambda$) fixed (i.e., a Wavelet transform across each row of the intermediate array). An embodiment of each of these two steps will be briefly described.

1. Wavelet Transform Along the Radial Variable

Viewing each column $\bar{f}^s(.,m)$ of data samples as if it were the Fourier transform of a scalar function, an orthonormal Wavelet transform processes an array $$x = \left(x(l): \frac{-n}{2} \le l < \frac{n}{2}\right)$$

according to the following diagram:

$$x \xrightarrow{FFT} \hat{x} \xrightarrow{partition} (\hat{x}^{(j)}) \xrightarrow{folding} (\tilde{x}^{(j)}) \xrightarrow{DCT} (\alpha_{j,k}) \quad \text{(diagr. 1)}$$

Here FFT signifies a 1-discrete Fourier transformation; partition signifies a step of separating the signal into J$\approx$log$_2$ (n) overlapping windows; folding projection signifies a step of 'folding' the data in overlapping windows into non-overlapping windows; and DCT signifies the application of an appropriate discrete cosine transform or discrete sine transform to each of the J separate windows.

Thus, it can be seen that block 122 is an inverse FFT, while the first step of the orthonormal Wavelet transform is a FFT (i.e., the first step of diagram 1). These two steps operate to cancel each other out. As a result, a computer (or other) implementation can simplify the processing by eliminating both the inverse FFT of block 122 and the FFT of the first step of the orthonormal Wavelet transform (illustrated in diagram 1). Thus, the Wavelet transform of block 125 can process either the weighted polar coordinate samples $\bar{f}^s(l,m)$ or the Radon data $R_f(\lambda, m)$, depending upon the implementation. The weighted polar coordinate samples $\bar{f}^s(l,m)$ are used below only for explanation purposes of the orthonormal Wavelet transform. However, it should be understood that the data processed in most steps of the orthonormal Wavelet transform could be either weighted polar coordinate samples f $\bar{f}^s(l,m)$ (if the FFT$^{-1}$ of block 122 is eliminated and the FFT or first step of the orthonormal Wavelet transform is eliminated) or the Radon data $R_f(\lambda, m)$ (if block 122 and all steps of the orthonormal Wavelet transform are maintained).

With this background, the weighted polar coordinate data samples $$\bar{f}^s(l,m); \frac{-n}{2} \le l < \frac{n}{2}$$

(which may have been converted to Radon data or time domain) may be viewed as an instance of the object $\hat{x}$ in diagram 1 above. The result is an array $(\alpha_{j,k}{}^s(m))$ of size n for each fixed s, m. For a fixed s, this can be viewed as the m$^{th}$ column of an array of size n×n. The variables j and k refer to the scale and location, respectively, as well understood by those skilled in the area of Wavelet transforms.

Thus, the result of the Wavelet transform along the radial variable is an array $(\alpha_{j,k}{}^s(m))$ of size n for each column of $\bar{f}^s(.,m)$ (or for each value of m). Because we haven columns, we have a resulting n×n intermediate array of $(\alpha_{j,k}{}^s)$ for each value of s. In essence, the n×n array shown in FIG. 6 will be replaced by the n×n intermediate array of $(\alpha_{j,k}^s)$ generated from the wavelet transform along the radial variable.

2. Wavelet Transform Along the Angular Variable

Next, a wavelet transform is applied along the angular variable (m) of the intermediate array $(\alpha_{j,k}^s)$, for each fixed value of l or λ (the radial variable). Thus, a Wavelet transform is applied across each of the rows of the intermediate array $(\alpha_{j,k}^s)$. This Wavelet transform may be applied as an orthonormal Wavelet transform or a multiWavelet transform, for example. The result, for a fixed $(s,j_1,k_1)$ is a sequence of wavelet coefficients $(\theta_\lambda)$, $\lambda=(s,j_1,k_1,j_2,k_2)$. The variables j and k are the scale and location, while subscript 1 is associated with the radial variable, while subscript 2 is associated with the angular variable (for j and k).

Therefore, the Wavelet transform of block 125 involves performing a Wavelet transform along the radial variable on data derived from the frequency domain values provided in polar coordinates (e.g., on data derived from $\tilde{f}^s(l,m)$). In an example embodiment as described above, an orthonormal Wavelet transform may be performed on the frequency domain values provided in digital polar coordinates (which may or may not be weighted) $\tilde{f}^s(l,m)$ after a time domain transform via block 122 (or transform to Radon data $R_f(\lambda, m)$). A Wavelet transform is then performed along the angular variable (of the intermediate array). Thus, the Wavelet transform of block 125 of FIG. 1 may include one or both steps of the orthonormal Wavelet transform along the radial variable and a Wavelet transform along the angular variable.

This completes the Ridgelet transform according to an example embodiment. Therefore, the coefficients $(\theta_\lambda)$ may be considered to be Ridgelet coefficients. Thus, the Ridgelet transformation transforms $n^2$ original data points into $2n^2$ Ridgelet coefficients.

III. Inverse Digital Ridgelet Transform

Figure 7:
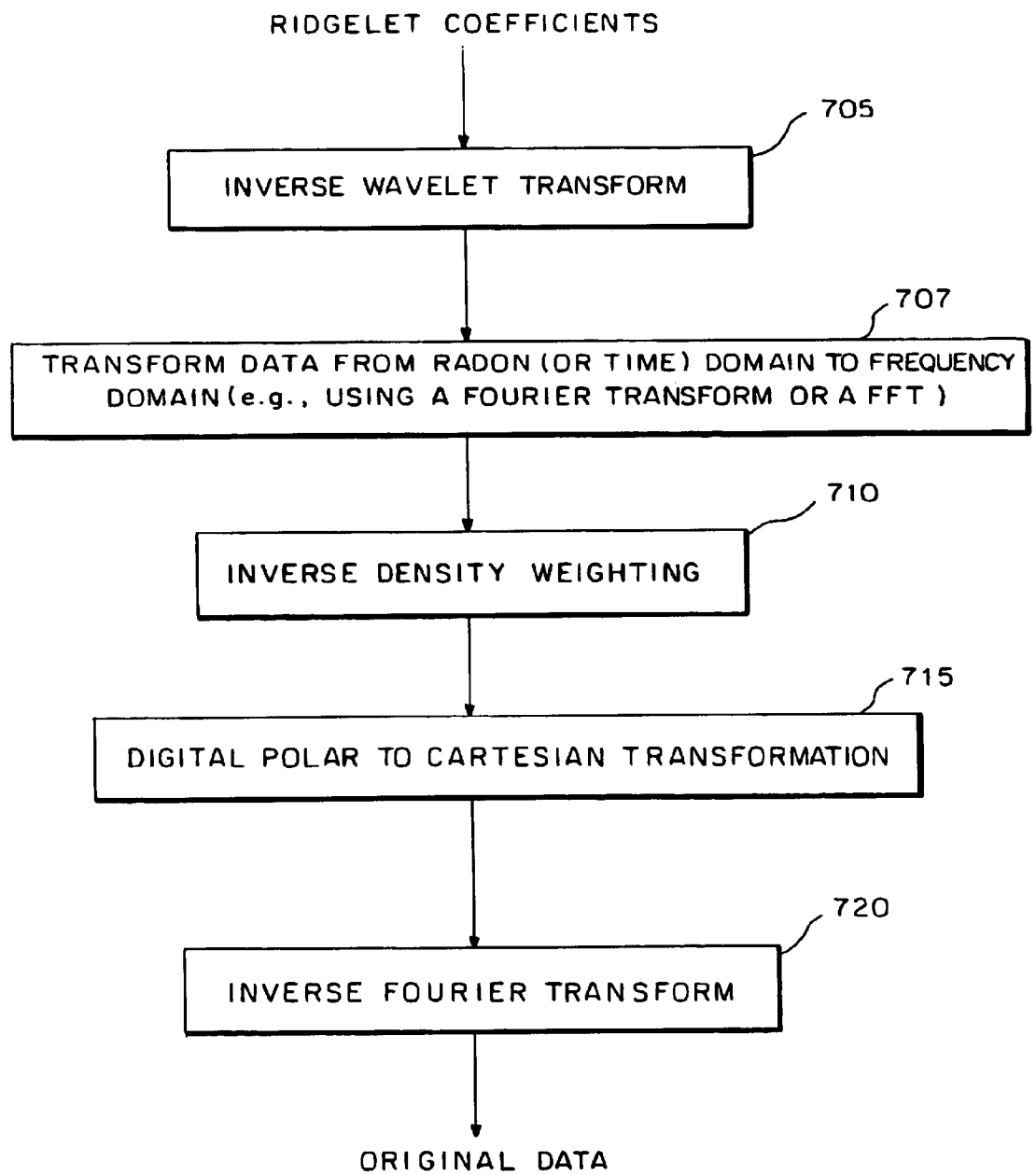
FIG. 7 is a flow chart illustrating an inverse Ridgelet transformation according to an example embodiment of the present invention.

FIG. 7 is a flow chart illustrating an inverse Ridgelet transformation according to an example embodiment of the present invention. The inverse Ridgelet transformation involves transforming the Ridgelet coefficients back to the original (i.e., time domain) information or data.

At block 705, an inverse Wavelet transform is applied to the $2n^2$ Ridgelet coefficients $(\theta_\lambda)$. According to an embodiment of the invention, this step involves two steps: First, an inverse Wavelet transformation is applied along the angular variable of the array of Ridgelet coefficients. Thus, a Wavelet transform is applied across each of the rows of the array of Ridgelet coefficients to recover the intermediate array $(\alpha_{j,k}^s)$. Next, a Wavelet transform (such as a partial Meyer Wavelet transform or an orthonormal Wavelet transform, for example) is applied across the radial variable of the intermediate array $(\alpha_{j,k}^s)$ to recover the array of Radon data $R_f(\lambda, m)$.

At block 707, the Radon (or time domain data) $R_f(\lambda, m)$ is transformed to the frequency domain using a Fourier transform or a FFT to produce the weighted polar coordinate values $\tilde{f}^s(l,m)$. (In an alternative embodiment, the Fourier transform of block 707 can be eliminated if the last step or an inverse Fourier transform of the inverse Wavelet transform of block 705 is also eliminated, as these two steps effectively cancel each other, in a manner similar to that described for FIG. 1).

At block 710 an inverse density weighting is applied to the array of weighted polar coordinate values $\tilde{f}^s(l,m)$ to recover the original or unweighted polar coordinates $\hat{f}^s(l,m)$ according to the following, for example:

$$\hat{f}^s(l,m) = \frac{\tilde{f}^s(l,m)}{\sqrt{w_{l,m}^s}}.$$

At block 715, the polar coordinate data samples $\hat{f}^s(l,m)$ are converted or transformed from digital polar to rectangular or Cartesian coordinates. In other words, in block 715, a pair of n×n arrays of data samples $\hat{f}^s$ provided in polar coordinates (i.e., in a polar grid) are transformed or converted into an array of data samples $\hat{f}(k_1,k_2)$ (e.g., Fourier coefficients) provided in a rectangular grid (rectangular grid or square lattice data samples). Several techniques can be used to perform this transform. According to an embodiment of the invention, an iterative relaxation technique. According to an embodiment, $\hat{f}(k_1,k_2)$ can be reconstructed by solving a least squares problem iteratively.

At block 720, a two-dimensional Inverse Fourier transform (IFT) is performed on the rectangular grid (or square lattice) frequency domain data samples (e.g., Fourier coefficients) $\hat{f}(k_1, k_2)$ to reconstruct or regenerate the original data $f(i_1,i_2)$ (e.g., the original time domain image data). This can be done using an inverse Fourier Transform (IFT), an inverse Discrete Fourier Transform (IDFT) or an inverse Fast Fourier Transform (IFFT).

IV. Example Implementations of Ridgelet and Inverse Ridgelet Transform Circuits

Figure 15:
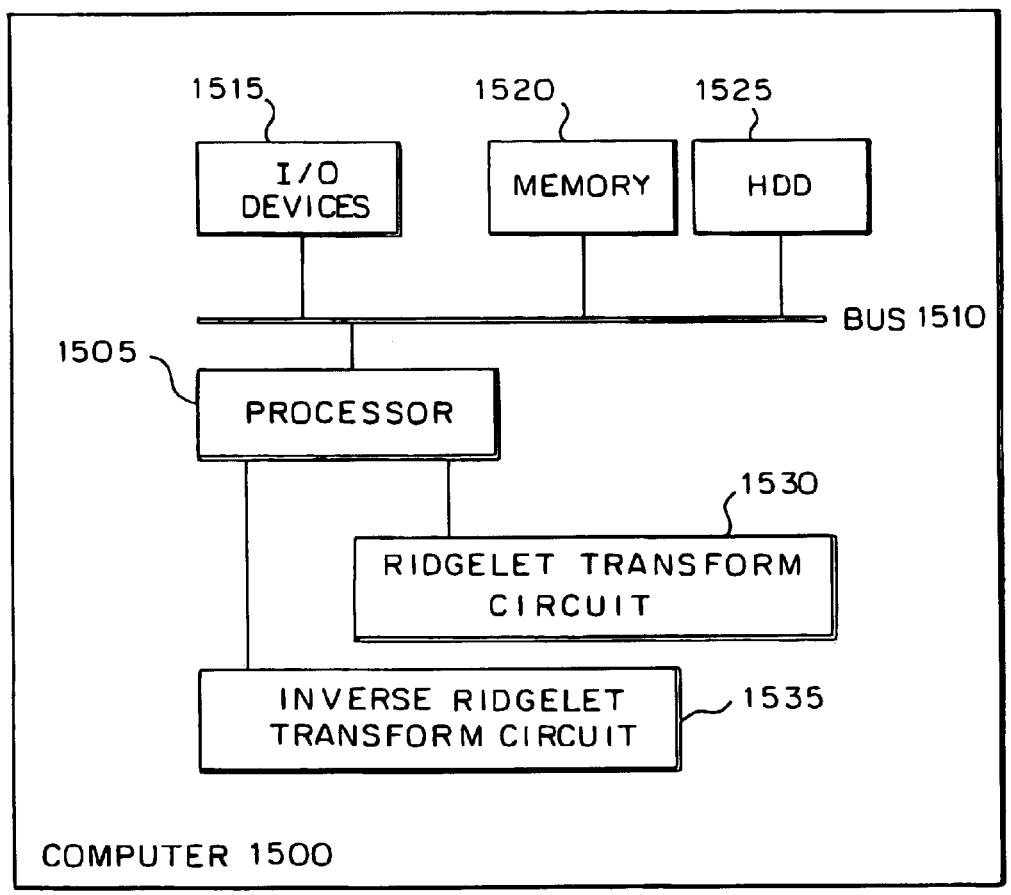
FIG. 15 is a block diagram of a computer according to an example embodiment of the present invention.

FIG. 15 is a block diagram of a computer that includes a Ridgelet transform circuit and an inverse Ridgelet transform circuit according to an example embodiment of the present invention. Referring to FIG. 15, a computer 1500 includes a processor 1505 connected to a host bus 1510. One or more input/output (I/O) devices 1515, memory 1520 and a hard disk drive (HDD) 1525 are also coupled to the host bus 1510. According to an embodiment of the present invention, the computer 1500 may also include a Ridgelet transform circuit 1530 to perform a Ridgelet transform and an inverse Ridgelet transform circuit 1535 to perform an inverse Ridgelet transform.

FIG. 16 is a block diagram of a Ridgelet transform circuit according to an example embodiment of the present invention. The Ridgelet transform circuit 1530 includes a Fourier transform circuit 1605 to perform a Fourier transform of input data, a Cartesian to digital polar transform circuit 1610 to perform a transform from Cartesian coordinates to digital polar coordinates, a weighting or normalization circuit 1615 for density weighting coefficients, an (optional) inverse Fourier transform circuit 1617 to convert the weighted frequency domain values provided in digital polar coordinates to Radon (or time domain) data, and a Wavelet transform circuit 1620 which performs a Wavelet transform and outputs the Ridgelet coefficients.

FIG. 17 is a block diagram of an inverse Ridgelet transform circuit according to an example embodiment of the present invention. Referring to FIG. 17, the inverse Ridgelet transform circuit 1535 includes an inverse wavelet transform circuit 1705 to perform an inverse wavelet transform on received Ridgelet coefficients and generate Radon data, a (optional) Fourier Transform circuit 1707 to transform the Radon data to weighted frequency domain values provided in digital polar coordinates, an inverse weighting circuit 1710 to perform an inverse weighting, a digital polar to Cartesian transform circuit 1715 to perform a transform from the digital polar coordinates to Cartesian coordinates and an inverse Fourier transform circuit 1720 for performing an inverse Fourier transform and outputting substantially the originally data.

Thus, as shown in FIGS. 15–17, the Ridgelet transform and inverse Ridgelet transform may be performed by dedicated hardware (such as circuits 1530 and 1535). Alternatively, according to another embodiment of the present invention, the Ridgelet transform and the inverse Ridgelet transform may be performed by a programmed general purpose computer or processor. For example, computer 1500 may include one or more software programs or modules stored in memory 1520 (FIG. 15) or stored on other media (e.g., floppy disks, read only memory or ROM, optical disk or CD ROM) that, when executed by processor 1505, causes the processor 1505 to perform either the Ridgelet transform or inverse Ridgelet transform. The software stored in memory 1520 also may cause the processor 1505 to perform any other functions described herein (such as thresholding, coding of coefficients, and/or transmission of information or coefficients, as noted in FIG. 12 below, as examples).

V. Applications and Advantages of the Ridgelet Transform

Thus, the Ridgelet transformation according to an embodiment of the present invention can be used to transform $n^2$ original data points (e.g., provided in a n×n array) into $2n^2$ Ridgelet coefficients (as an example). However, due to the nature of this transformation, many of the Ridgelet coefficients will have very small or negligible values in comparison to the larger Ridgelet coefficient values. Thus, thresholding may be used to filter or select those Ridgelet coefficients having a value greater than a threshold or to select a selected number of the largest Ridgelet coefficients, while discarding the smaller Ridgelet coefficients. For example, the largest 1% of the Ridgelet coefficients may be retained, and the remaining Ridgelet coefficients may be discarded (or filtered out) or made zero. Alternatively, Ridgelet coefficients having an amplitude or value greater than a threshold are selected for further processing, and those Ridgelet coefficients having a value less than or equal to the threshold will be discarded or made to be zero. Thus, the Ridgelet transformation can provide a much more efficient representation of data or information, since the energy of the original information (e.g., of the original image data) will be represented by a relatively small number of Ridgelet coefficients.

The Ridgelet transform can advantageously be used in a number of applications including compression, statistical estimation (including noise removal, edge detection and feature detection), scientific or mathematical computing, and the like.

A. Compression

As noted above, the Ridgelet transform can be used to transform an n×n array of data samples into $2n^2$ Ridgelet coefficients. A thresholding algorithm can be used to select those Ridgelet coefficients which are greater than a threshold, or select a predetermined number of the largest Ridgelet coefficients, etc.

Figure 8:
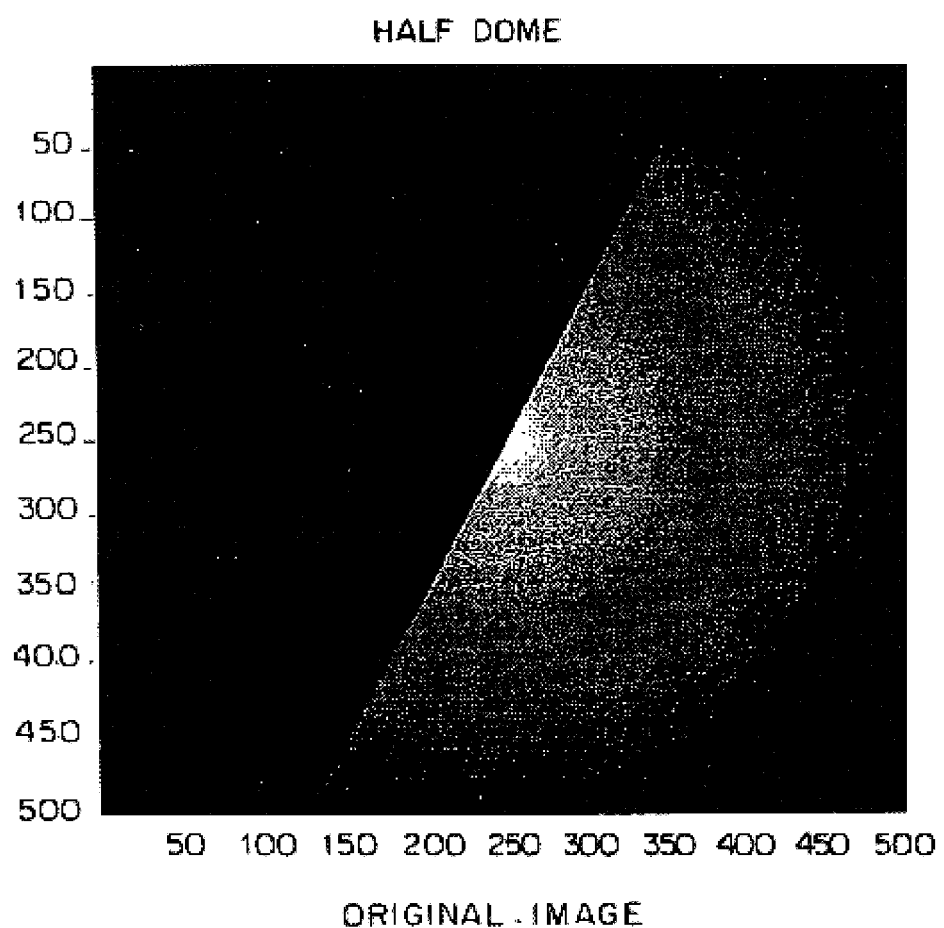
FIG. 8 is a diagram illustrating an original image of a half dome according to an example embodiment of the present invention.
Figure 9:
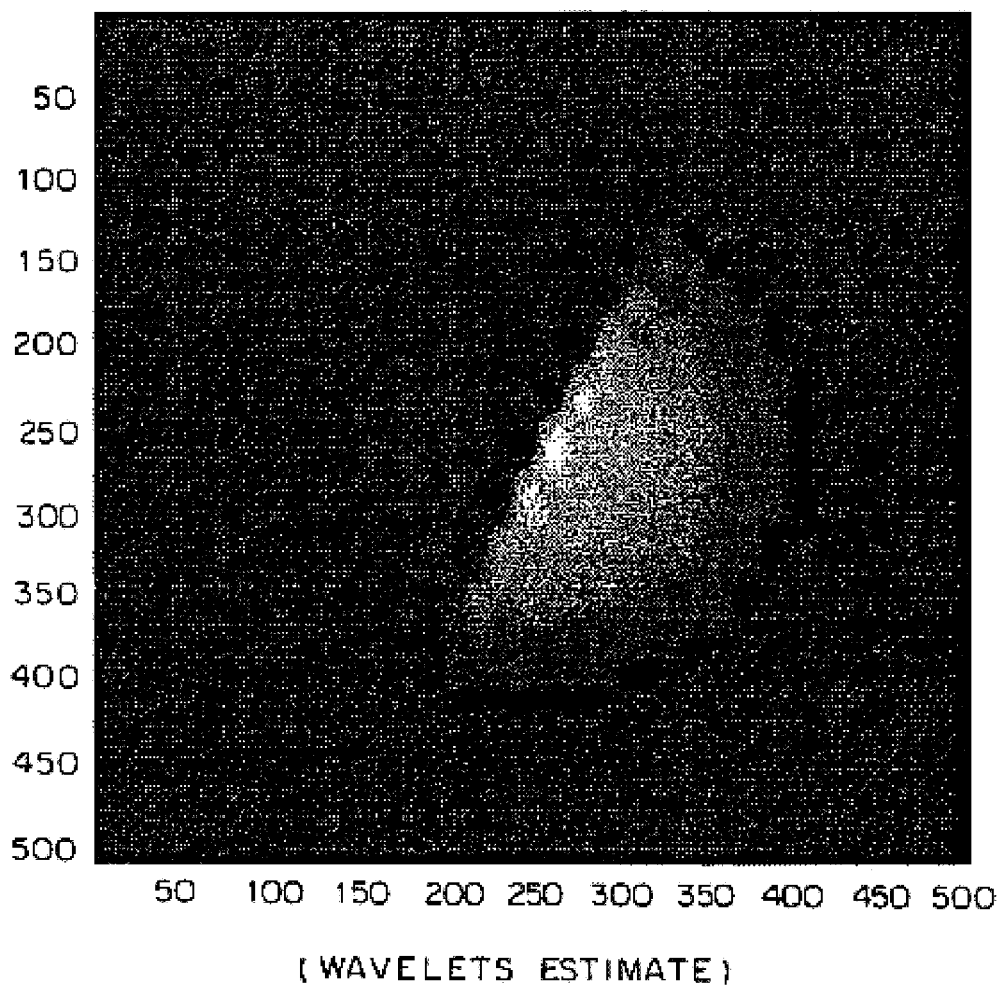
FIG. 9 is a diagram illustrating a reconstruction of the half dome image that was compressed using Wavelets based on 128 coefficients.
Figure 10:
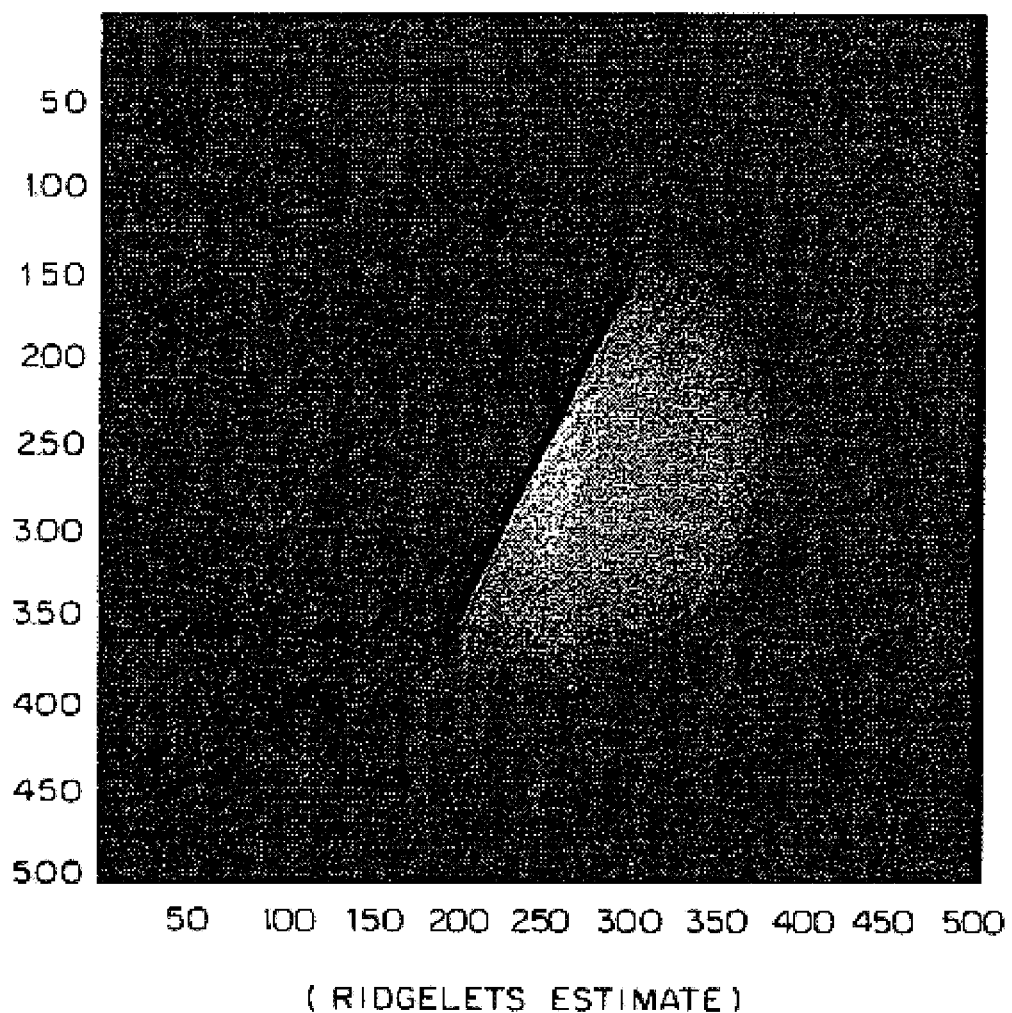
FIG. 10 is a diagram illustrating a reconstruction of the half dome image that was compressed using Ridgelets according to an embodiment of the present invention based on 128 Ridgelet coefficients.

The Ridgelet transform is particularly helpful in compressing image data and provides improved accuracy, particularly along edges or lines. FIG. 8 is a diagram illustrating an original image of a half dome according to an example embodiment of the present invention. The image of FIG. 8 provided merely as an example. FIG. 9 is a diagram illustrating a reconstruction of the half dome image that was compressed using Wavelets based on 128 coefficients. FIG. 10 is a diagram illustrating a reconstruction of the half dome image that was compressed using Ridgelets (or the Ridgelet transform) according to an embodiment of the present invention based on 128 Ridgelet coefficients (out of 262,144 Ridgelet coefficients). Thus, in FIG. 10, only 128 coefficients out of 262,144 coefficients were selected (or retained), with the remaining coefficients being discarded.

The image of FIG. 9 was reconstructed using 128 Wavelet coefficients and provides only a rough or jagged edge. This can present problems in the areas of medical imaging where it may be critical that edges or other lines be accurately identified. In contrast, due to the algorithm and particularly, due to the processing along radial and/or angular variables, the Ridgelet transform of the present invention provides improved image reconstruction, particularly along lines or edges. As shown in FIG. 10, using only 128 out of 262, 144 possible Ridgelet coefficients, the image of FIG. 10 provides a clear and well-defined edge along the boundary of the half-dome. Thus, the Ridgelet transform of the present invention can provide a significant improvement over existing techniques. FIGS. 8–10 are provided merely as an example to illustrate the advantages of the Ridgelet transformation according to an example embodiment of the present invention. Therefore, it can be seen that the Ridgelet transformation according to an embodiment of the present invention provides a very efficient way to represent data that allows a more accurate reconstruction of the original image or information.

Figure 11:
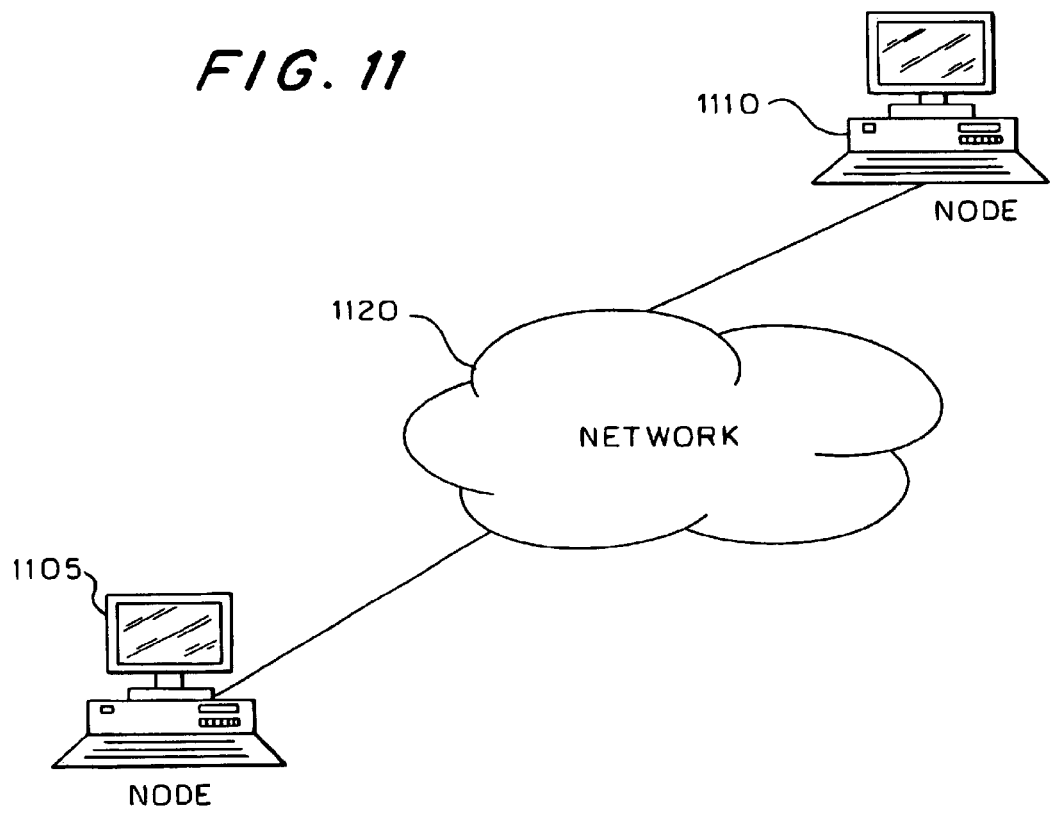
FIG. 11 is a block diagram of a network system according to an example embodiment of the present invention.
Figure 12:
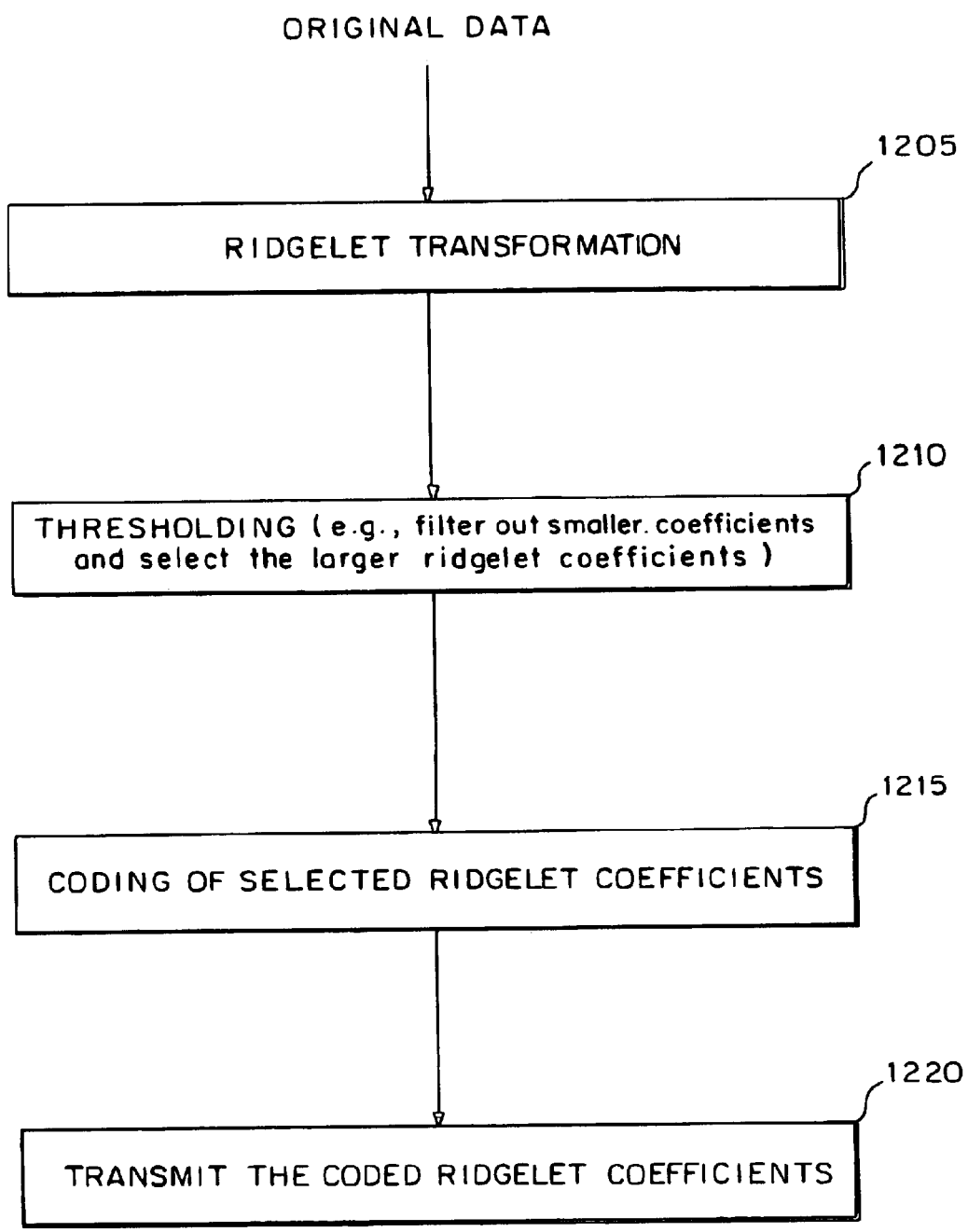
FIG. 12 is a flow chart illustrating data processing according to an example embodiment of the present invention.

Once an image (or other information) has been compressed using a Ridgelet transformation, the image or information can then be more efficiently stored in a computer memory, or can be more efficiently transmitted over a communications link. FIG. 11 is a block diagram of a network system according to an example embodiment of the present invention. FIG. 12 is a flow chart illustrating data processing according to an embodiment of the present invention. Referring to FIG. 11, the network system includes a transmitting node 1105 and a receiving node 1110 coupled via a network 1120. Nodes 1105 and 1110 may each be a computer (such as a personal computer), a server or other processing or computing device. Network 1120 may be a Local Area Network (LAN), a Wide Area Network (WAN), the Internet or other network, and typically includes one or more communication links. Network 1120 can be a wireless or wireline network. Network 1120 has limited bandwidth, and thus, there is a need to efficiently represent images and other information transmitted over network 1120.

Referring to FIG. 12, the operation of the transmitting node 1105 will be briefly described according to an example embodiment. At block 1205, the transmitting node 1105 performs a Ridgelet transformation on an original image or the original information to be transmitted over network 1120. At block 1210, the node 1105 performs a thresholding or filtering on the resulting Ridgelet coefficients. This step operates as a filter to select a predetermined number of the largest Ridgelet coefficients (e.g., those coefficients greater than a threshold, or a predetermined number of the largest coefficients). At block 1215, node 1105 may then code the selected Ridgelet coefficients using one or more well know coding algorithms. Coding algorithms which can be used, for example, include Run Length Encoding (RLE), Huffman coding, zero tree coding, etc. At block 1220, node 1105 then transmits or sends the coded Ridgelet coefficients to receiving node 1110 via the network 1120.

Receiving node 1110 receives the transmitted Ridgelet coefficients. The receiving node then decodes the coefficients and performs an inverse Ridgelet transformation to reconstruct or generate the original data. Because many of the smaller coefficients are discarded at the thresholding step, this process may be described as lossy. However, as shown in FIGS. 8–10, the Ridgelet transform provides a technique to efficiently represent an image or information while allowing a more accurate reconstruction of the original image/information, especially along edges or lines.

B. Statistical Estimation

The Ridgelet transformation of the present invention can also advantageously be used in the area of statistical estimation, including noise removal, edge detection and feature detection, and the like. As an example, an image (or other information) may be generated by a measuring instrument, such as a medical instrument (e.g.,ultrasound, magnetic, resonance imaging, etc.), a telescope or digital camera (which generate a graphical image) or the like. However, because these instruments are imperfect, the generated image typically includes noise and other unwanted signals. The Ridgelet transform can then be applied to the image data samples (or data). The resulting array of Ridgelet coefficients will include coefficients having a relatively large value (or amplitude) primarily representing the energy of the image, while the many smaller coefficients(smaller amplitude) will typically be the result of noise and other unwanted signals. Thus, a thresholding or filtering technique can be used to filter out only the largest Ridgelet coefficients (associated with the image or data), while discarding the smaller Ridgelet coefficients (typically associated with noise or other unwanted signals). As a result, the noise (or other unwanted signals) can be removed or filtered by: using the Ridgelet transform and then using a thresholding technique to select only a specific number of the largest Ridgelet coefficients.

The Ridgelet transformation can be effectively used for edge detection and feature extraction. As shown in FIGS. 8–10, the Ridgelet transformation provides an efficient technique for represent data while allowing an accurate reconstruction of the original image, particularly along edges. This technical advantage is believed to result from the unique processing along the radial variable and/or the angular variable.

C. Scientific or Mathematical Computing

The unique properties of the Ridgelet transform (which provide a very efficient representation of the information, while allowing an accurate reconstruction of the original data or information) can also be advantageously used in the area of scientific or mathematical computing.

A common problem encountered in scientific or mathematical computing is the multiplication of two large arrays or vectors. This problem is frequently encountered in such areas as signal processing, graphic processing (logical operation), etc.

Figure 13:
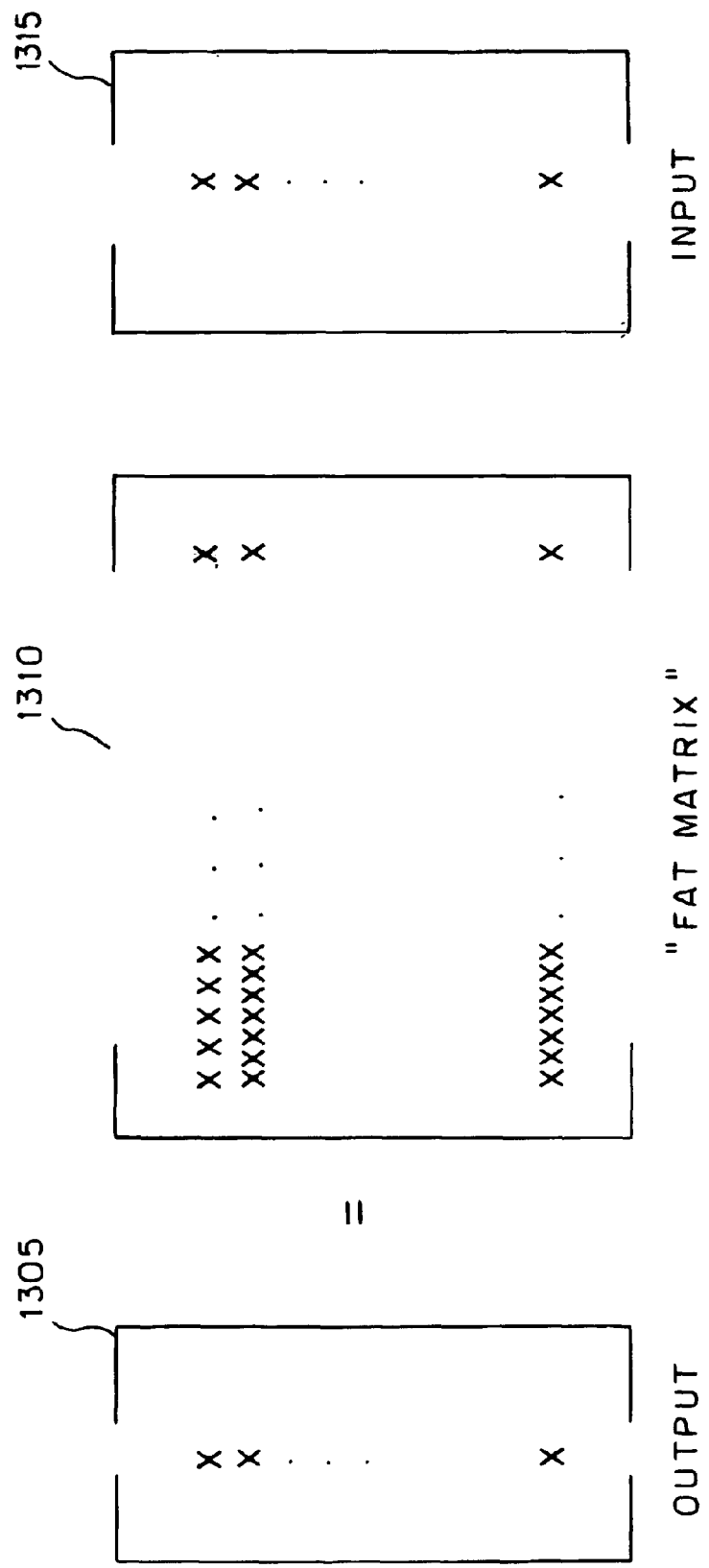
FIG. 13 is a diagram illustrating a multiplication of two arrays using traditional techniques.

FIG. 13 is a diagram illustrating a multiplication of two arrays using traditional techniques. Referring to FIG. 13, an input array 1315 will be multiplied by an array 1310 to generate an output array 1305. In this example, the input array 1315 is a one-dimensional array of size n. Also, in this example, array 1310 is a two-dimensional array of size n×n. Array 1310 may be described as a "fat matrix" or a full matrix or array because it includes generally $n^2$ coefficients or values (elements of the array). Thus, to multiply arrays 1315 and 1310 together will require on the order of $n^2$ operations. If n is a very large value (e.g., $10^7$), this will require a very large number of operations (e.g., 1014) to perform, which may be impractical on most computers. Thus, there is a need for a more efficient technique for performing this multiplication operation.

Figure 14:
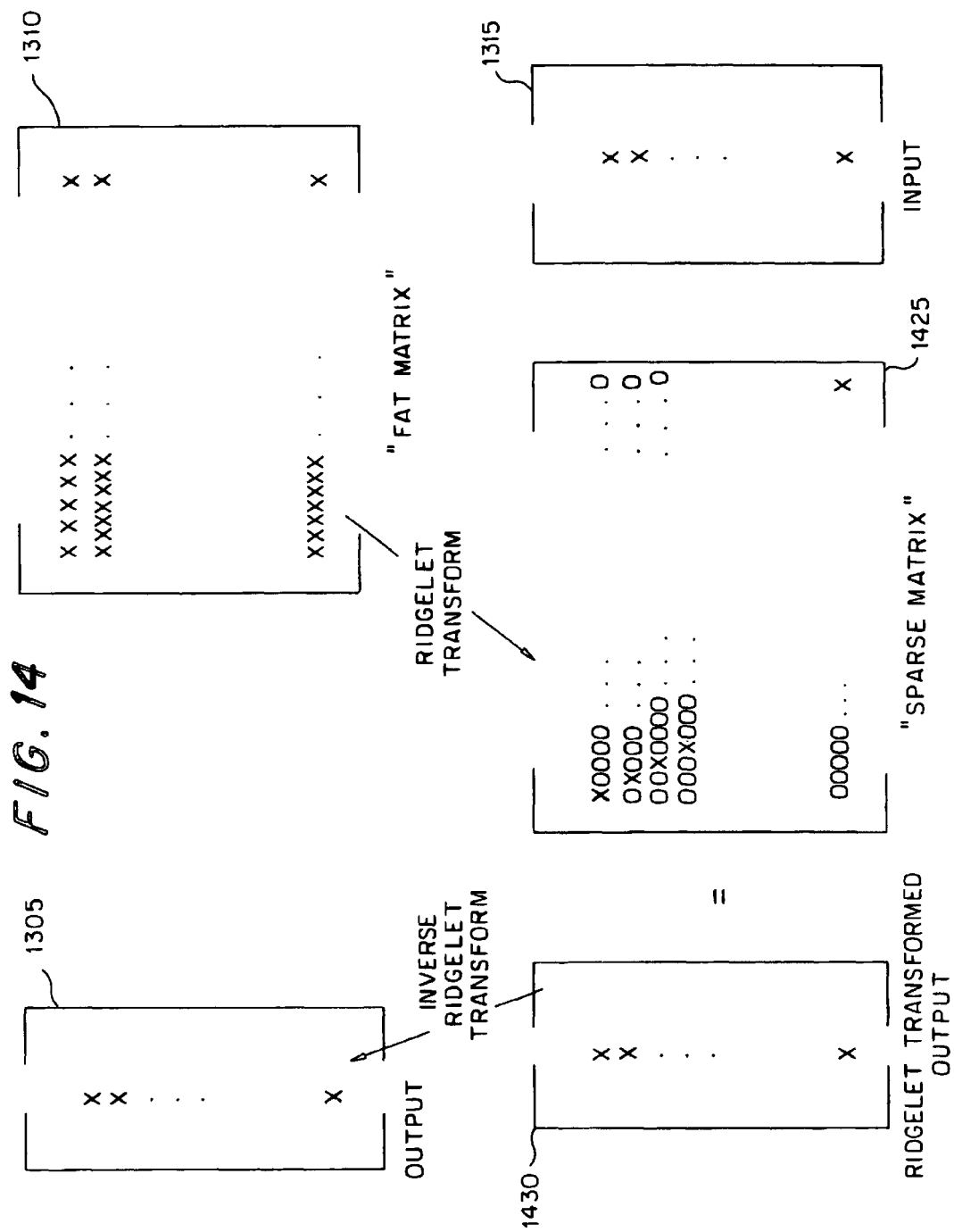
FIG. 14 is a diagram illustrating a multiplication of two arrays using a Ridgelet transformation according to an example embodiment of the present invention.

FIG. 14 is a diagram illustrating a multiplication of two arrays using a Ridgelet transformation according to an example embodiment of the present invention. Referring to FIG. 14, a Ridgelet transform followed by thresholding is applied to the array 1310 (the "fat matrix") to generate an array 1425 having a "sparse matrix" in which there are a very limited number (or few) Ridgelet coefficients. For example, there may be only n Ridgelet coefficients in the sparse matrix of array 1425, with the n Ridgelet coefficients indicated by the Xs along the diagonal. The input array 1315 is then multiplied by the array 1425 of the sparse matrix to generate a Ridgelet transformed output array 1430, which in this example embodiment is a one dimensional array of size n. An inverse Ridgelet transform is then applied to the Ridgelet transformed output array to generate the output array 1305.

The Ridgelet transform of the fat matrix array 1310 (of size n×n) can be performed in approximately n log n operations. The multiplication of the input array 1310 (size n) with the sparse matrix array 1425 (only n coefficients) can be performed in approximately n operations (in this example). And, the inverse Ridgelet transform can be applied to the Ridgelet transformed output array 1430 in approximately n log n operations. Thus, as shown in FIG. 14, the multiplication of the two arrays 1310 and 1315 can be performed using the Ridgelet transform according to an embodiment of the present invention in approximately: (2n log n+n) operations, which is far less operations than the n2 operations required using the traditional mathematical techniques.

As illustrated in FIGS. 8 and 10 above, the use of only a small number of Ridgelet coefficients can provide an efficient but accurate representation of the original information or data. Thus, in the case of mathematical or scientific computing, the output array 1305 (FIG. 14) generated using the Ridgelet transform and inverse Ridgelet transform is a very good approximation to the output array generated using the traditional techniques (FIG. 13). However, the output array shown in FIG. 14 generated using the Ridgelet transform is generated using far less operations than the traditional technique. Likewise, the Ridgelet transform and inverse Ridgelet transform can be applied to a wide variety of mathematical or scientific computing problems in a similar manner. The problem and solution illustrated in FIGS. 13 and 14, respectively, provide only one application of the Ridgelet transform of the present invention, and the present invention is not limited thereto.

In another area, the Ridgelet transformation can be applied to inverse problems, such as those encountered in Tomography. Briefly, as an example, a medical image is obtained. A Ridgelet transform is applied to the medical image using techniques very similar to those described above for the Ridgelet transform. A thresholding algorithm is then applied to the resulting Ridgelet coefficients corresponding to the medical image. In this manner any scattering in the medical image that degrades the image can be removed. Also the edges of the objects in the image can be more clearly defined.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A computer for more efficiently representing information, the computer comprising:

a Cartesian to digital-polar transform circuit to transform frequency domain values provided in Cartesian coordinates to digital polar coordinates;

a weighting circuit coupled to the Cartesian to digital-polar transform circuit to weight or normalize the frequency domain values provided in digital polar coordinates; and a Wavelet transform circuit coupled to the weighting circuit for performing a wavelet transform on data derived from the frequency domain values provided in digital polar coordinates.

2. A computer for more efficiently representing information, the computer comprising:

a Fourier transform circuit to transform original data samples into frequency domain values provided in Cartesian coordinates;

a Cartesian to digital-polar transform circuit coupled to the Fourier transform circuit to transform the frequency domain values provided in Cartesian coordinates to digital polar coordinates;

a weighting circuit coupled to the Cartesian to digital-polar transform circuit to weight or normalize the frequency domain values provided in digital polar coordinates; and a Wavelet transform circuit coupled to the weighting circuit to perform a wavelet transform on data derived from the frequency domain values provided in digital polar coordinates.

3. A computer for more efficiently representing information, the computer comprising:

means for transforming original data samples into frequency domain values provided in Cartesian coordinates;

means for transforming the frequency domain values provided in Cartesian coordinates to digital polar coordinates;

means for weighting the frequency domain values provided in digital polar coordinates; and means for performing a Wavelet transform on data derived from the frequency domain values provided in digital polar coordinates to generate Wavelet coefficients.

4. The computer of claim 3, and further comprising means for filtering the Wavelet coefficients to select a group of the largest Wavelet coefficients and discard the remaining Wavelet coefficients.

5. A computer for more efficiently representing information, the computer comprising:

a Fourier transform circuit to transform original data samples into frequency domain values provided in Cartesian coordinates;

a Cartesian to digital-polar transform circuit coupled to the Fourier transform circuit to transform the frequency domain values provided in Cartesian coordinates to digital polar coordinates;

a weighting circuit coupled to the Cartesian to digital-polar transform circuit to weight or normalize the frequency domain values provided in digital polar coordinates;

a Wavelet transform circuit coupled to the weighting circuit to perform a wavelet transform on data derived from the frequency domain values provided in digital polar coordinates;

an inverse Wavelet transform circuit to inverse Wavelet transform the Wavelet Coefficients;

an inverse weighting circuit for inverse weighting data derived from the output of the inverse Wavelet transform circuit to substantially regenerate the frequency domain values provided in digital polar coordinates;

a digital-polar to Cartesian transform circuit to substantially regenerate frequency domain values provided in Cartesian coordinates based upon the frequency domain values provided in digital polar coordinates; and an inverse Fourier transform circuit to substantially regenerate the original data samples based upon the frequency domain values provided in Cartesian coordinates.

6. The computer of claim 3, wherein each said means comprises a programmed general purpose computer.

7. A method of compressing image data comprising the steps of:

receiving original data samples;

transforming original data samples into frequency domain values provided in Cartesian coordinates;

transforming the frequency domain values provided in Cartesian coordinates to digital polar coordinates;

weighting the frequency domain values provided in digital polar coordinates;

performing a Wavelet transform on data derived from the frequency domain values provided in digital polar coordinates to generate Wavelet coefficients; and filtering the wavelet coefficients to select a group of larger Wavelet coefficients and discard the remaining Wavelet coefficients.

8. The method of claim 7, wherein the step of transforming original data samples comprises the step of performing a Fourier transform of the original data samples to obtain Fourier coefficients in Cartesian coordinates.

9. A method of compressing image data comprising the steps of:

receiving original data samples;

transforming original data samples into frequency domain values provided in Cartesian coordinates;

transforming the frequency domain values provided in Cartesian coordinates to digital polar coordinates;

weighting the frequency domain values provided in digital polar coordinates;

performing a Wavelet transform on data derived from the frequency domain values provided in digital polar coordinates to generate Wavelet coefficients; and filtering the wavelet coefficients to select a group of larger Wavelet coefficients and discard the remaining Wavelet coefficients, wherein said step of filtering comprises the steps of:
determining which Wavelet coefficients are greater than a threshold value, and
selecting those Wavelet coefficients that are greater than the threshold value and discarding the remaining Wavelet coefficients.

10. the method of claim 7, wherein said step of transforming the frequency domain values provided in Cartesian coordinates to digital polar coordinates comprises the step of interpolating the frequency domain values provided in Cartesian coordinates to digital polar coordinate values.

11. The method of claim 7, wherein said step of transforming the frequency domain values provided in Cartesian coordinates to digital polar coordinates comprises the steps of:

identifying a plurality of polar coordinate sampling points;

generating a trigonometric polynomial based upon the frequency domain values provided in Cartesian coordinates; and resampling the generated trigonometric polynomial at one or more of the plurality of polar coordinate sampling points to obtain the frequency domain values in polar coordinates.

12. The method of claim 7, wherein said step of transforming the frequency domain values provided in Cartesian coordinates to digital polar coordinates comprises the steps of:

identifying a set or radial lines through an origin of the frequency domain values;

identifying a set of sampling points along each radial line, the set of radial lines and the sampling points defining a polar grid; and interpolating the frequency domain values provided in Cartesian coordinates onto the lines and sampling points of the polar grid.

13. The method of claim 12, wherein said step of interpolating comprises the steps of:

generating a trigonometric polynomial based upon the frequency domain values provided in Cartesian coordinates; and resampling the generated trigonometric polynomial at one or more of the plurality of sampling points in the polar grid to obtain the frequency domain values in polar coordinates.

14. The method of claim 7, wherein said step of performing a Wavelet transform on data derived from the frequency domain values provided in digital polar coordinates comprises the steps of:

performing a Wavelet transform along a radial variable with the angular variable fixed to generate an intermediate array; and performing a Wavelet transform along the angular variable of the intermediate array, with the radial variable fixed to generate a plurality of Wavelet coefficients.

15. A computer program encoded on a computer readable medium for causing data to be more efficiently represented, the computer program causing the following to be performed when executed by a computer:

receiving original data samples;

transforming original data samples into frequency domain values provided in Cartesian coordinates;

transforming the frequency domain values provided in Cartesian coordinates to digital polar coordinates;

weighting the frequency domain values provided in digital polar coordinates; and performing a Wavelet transform on data derived from the frequency domain values provided in digital polar coordinates to generate Wavelet coefficients.

16. The computer program of claim 15, and further causing the following to be performed when executed by the computer:

filtering the wavelet coefficients to select a group of larger Wavelet coefficients and discard the remaining Wavelet coefficients.

17. A computer program encoded on a computer readable medium for causing data to be more efficiently represented, the computer program causing the following to be performed when executed by a computer:

receiving original data samples;

transforming original data samples into frequency domain values provided in Cartesian coordinates;

transforming the frequency domain values provided in Cartesian coordinates to digital polar coordinates, comprising:

identifying a plurality of polar coordinate sampling points;

generating a trigonometric polynomial based upon the frequency domain values provided in Cartesian coordinates; and resampling the generated trigonometric polynomial at one or more of the plurality of polar coordinate sampling points to obtain the frequency domain values in polar coordinates;

weighting the frequency domain values provided in digital polar coordinates; and performing a Wavelet transform on data derived from the frequency domain values provided in digital polar coordinates to generate Wavelet coefficients.

18. A method of removing noise in a signal comprising the steps of:

receiving original data samples of the signal;

transforming original data samples into frequency domain values provided in Cartesian coordinates;

transforming the frequency domain values provided in Cartesian coordinates to digital polar coordinates;

weighting the frequency domain values provided in digital polar coordinates;

performing a Wavelet transform on data derived from the frequency domain values provided in digital polar coordinates to generate Wavelet coefficients; and filtering the wavelet coefficients to select a group of larger Wavelet coefficients and discard the remaining Wavelet coefficients to thereby remove at least some of the noise in the signal.

19. A method of removing noise in a signal comprising the steps of:

receiving original data samples of the signal;

transforming original data samples into frequency domain values provided in Cartesian coordinates;

transforming the frequency domain values provided in Cartesian coordinates to digital polar coordinates;

weighting the frequency domain values provided in digital polar coordinates;

performing a Wavelet transform on data derived from the frequency domain values provided in digital polar coordinates to generate Wavelet coefficients; and filtering the wavelet coefficients to select a group of larger Wavelet coefficients and discard the remaining Wavelet coefficients to thereby remove at least some of the noise in the signal, wherein said step of performing a wavelet transform comprises the steps of:

transforming the weighted frequency domain values to Radon data, and performing an orthonormal wavelet transform on the Radon data along the radial variable.

20. The method of claim 19, wherein said step of performing a wavelet transform further comprises the step of performing a wavelet transform along the angular variable.

21. A method of efficiently transmitting information over a network comprising the steps of:

receiving original data samples;

transforming original data samples into frequency domain values provided in Cartesian coordinates;

transforming the frequency domain values provided in Cartesian coordinates to digital polar coordinates;

weighting the frequency domain values provided in digital polar coordinates;

performing a Wavelet transform on data derived from the frequency domain values provided in digital polar coordinates to generate Wavelet coefficients;

filtering the wavelet coefficients to select a group of larger Wavelet coefficients and discard the remaining Wavelet coefficients; and transmitting the selected group of Wavelet coefficients from a transmitting node to a receiving node over a network.

* * * * *

UNITED STATES PATENT AND TRADEMARK OFFICE
CERTIFICATE OF CORRECTION

| | | |
|---|---|---|
| PATENT NO. | : 6,766,062 B1 | Page 1 of 1 |
| APPLICATION NO. | : 09/504924 | |
| DATED | : July 20, 2004 | |
| INVENTOR(S) | : Donoho et al. | |

It is certified that error appears in the above-identified patent and that said Letters Patent is hereby corrected as shown below:

In the Specification, please insert:

-- FEDERALLY-SPONSORED RESEARCH OR DEVELOPMENT

This invention was made with Government support under contracts F49620-96-1-0028 awarded by the Air Force Office of Scientific Research and 9505151 awarded by the National Science Foundation. The Government has certain rights in this invention. --

Signed and Sealed this
Seventeenth Day of April, 2012

David J. Kappos
*Director of the United States Patent and Trademark Office*